United States Patent
Lee et al.

(10) Patent No.: US 10,521,959 B2
(45) Date of Patent: Dec. 31, 2019

(54) METHODS OF AND DEVICES FOR REDUCING STRUCTURE NOISE THROUGH SELF-STRUCTURE ANALYSIS

(71) Applicant: SAMSUNG ELECTRONICS CO., LTD., Suwon-si, Gyeonggi-do (KR)

(72) Inventors: Je-Hyun Lee, Suwon-si (KR); Sung-Hwan Jang, Bucheon-si (KR); Sung-Youn Chung, Seoul (KR); Jae-Hoon Jeong, Hwaseong-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/687,605

(22) Filed: Aug. 28, 2017

(65) Prior Publication Data

US 2018/0158241 A1 Jun. 7, 2018

(30) Foreign Application Priority Data

Dec. 7, 2016 (KR) .................. 10-2016-0165559

(51) Int. Cl.
| | | |
|---|---|---|
| G06F 17/30 | (2006.01) | |
| G06T 17/20 | (2006.01) | |
| G06K 9/62 | (2006.01) | |
| G06K 9/00 | (2006.01) | |
| G06K 9/40 | (2006.01) | |
| G06T 19/20 | (2011.01) | |

(52) U.S. Cl.
CPC ........ *G06T 17/205* (2013.01); *G06K 9/00201* (2013.01); *G06K 9/40* (2013.01); *G06K 9/6267* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 5,508,827 A | * | 4/1996 | Po-Chieh | H04N 1/6022 358/518 |
| 5,623,555 A | * | 4/1997 | Nelson | G06T 9/00 345/442 |
| 5,799,111 A | * | 8/1998 | Guissin | H04N 19/86 358/447 |
| 6,175,643 B1 | * | 1/2001 | Lai | G06T 3/4046 382/131 |
| 6,356,263 B2 | * | 3/2002 | Migdal | G06T 17/20 345/421 |

(Continued)

FOREIGN PATENT DOCUMENTS

| | | |
|---|---|---|
| KR | 20090104529 A | 10/2009 |
| KR | 0933705 B | 12/2009 |

(Continued)

*Primary Examiner* — Martin Mushambo
(74) *Attorney, Agent, or Firm* — Volentine, Whitt & Francos, PLLC

(57) ABSTRACT

To reduce structure noise, input data representing an input structure is obtained and boundary conditions are set by classifying data of each of multiple structure elements of the input data as a signal component or a noise component. A smoothing operation is performed with respect to the input data and based on the boundary conditions. Output data representing an output structure is provided by reducing noise from the input structure.

20 Claims, 29 Drawing Sheets

(56) References Cited

U.S. PATENT DOCUMENTS

| | | | |
|---|---|---|---|
| 6,760,022 B1* | 7/2004 | Anderson | G06T 17/20 345/420 |
| 7,617,079 B2* | 11/2009 | Stewart | G06T 17/20 345/423 |
| 7,697,736 B2* | 4/2010 | Kee | G06K 9/00248 382/118 |
| 7,843,456 B2* | 11/2010 | Xu | G06T 13/40 345/419 |
| 7,936,352 B2 | 5/2011 | Baran et al. | |
| 8,175,853 B2* | 5/2012 | Magerlein | G06F 17/16 703/1 |
| 8,411,080 B1* | 4/2013 | Zimmermann | G06T 19/20 345/419 |
| 8,427,470 B2* | 4/2013 | Ikeda | G06F 19/26 345/419 |
| 8,614,708 B2* | 12/2013 | Winnemoeller | G06T 11/001 345/423 |
| 8,687,885 B2* | 4/2014 | Yasan | G06T 5/002 382/167 |
| 9,009,179 B2* | 4/2015 | Cohen | G06F 17/30958 707/758 |
| 9,189,600 B2 | 11/2015 | Spilker et al. | |
| 9,207,069 B2 | 12/2015 | Kitamura et al. | |
| 9,245,345 B2* | 1/2016 | Wang | G06T 17/05 |
| 9,373,192 B2* | 6/2016 | Wei | G06T 17/205 |
| 9,477,798 B1* | 10/2016 | Guoy | G06T 17/20 |
| 9,520,001 B2* | 12/2016 | Goldman | G06T 19/20 |
| 9,626,797 B2* | 4/2017 | Schmidt | G06T 17/20 |
| 9,734,628 B2* | 8/2017 | Tena | G06T 17/20 |
| 9,818,216 B2* | 11/2017 | Sela | G06T 13/40 |
| 9,886,792 B2* | 2/2018 | Schmidt | G06T 19/20 |
| 10,121,266 B2* | 11/2018 | Mourning | G06T 15/20 |
| 2001/0056308 A1* | 12/2001 | Petrov | G06T 17/20 700/98 |
| 2004/0071363 A1* | 4/2004 | Kouri | G06K 9/00516 382/276 |
| 2004/0160440 A1* | 8/2004 | Barth | G06K 9/00201 345/419 |
| 2005/0168460 A1* | 8/2005 | Razdan | G06F 17/30398 345/419 |
| 2005/0228272 A1* | 10/2005 | Yu | A61B 6/466 600/425 |
| 2006/0028466 A1* | 2/2006 | Zhou | G06T 17/20 345/420 |
| 2006/0265198 A1* | 11/2006 | Kanai | G06K 9/00201 703/2 |
| 2007/0002043 A1* | 1/2007 | Guenter | G06T 17/20 345/420 |
| 2007/0172145 A1* | 7/2007 | Altunbasak | G06T 5/009 382/274 |
| 2007/0211052 A1* | 9/2007 | Tak | G06T 15/00 345/426 |
| 2008/0036755 A1* | 2/2008 | Bae | G06F 17/50 345/418 |
| 2008/0069438 A1* | 3/2008 | Winn | G06K 9/4638 382/160 |
| 2008/0309662 A1* | 12/2008 | Hassner | G06K 9/20 345/419 |
| 2009/0184957 A1* | 7/2009 | Kim | G06T 9/20 345/420 |
| 2010/0002948 A1* | 1/2010 | Gangwal | G06T 7/579 382/254 |
| 2010/0226589 A1* | 9/2010 | Mukherjee | G06T 17/20 382/264 |
| 2011/0074777 A1* | 3/2011 | Lima | G06T 17/10 345/420 |
| 2012/0022837 A1* | 1/2012 | Asbury | G06T 17/05 703/2 |
| 2012/0035887 A1 | 2/2012 | Augenbraun et al. | |
| 2012/0120074 A1* | 5/2012 | Huysmans | G06T 17/20 345/420 |
| 2013/0004064 A1* | 1/2013 | Yamaguchi | G06K 9/46 382/164 |
| 2013/0016099 A1* | 1/2013 | Rinard | G06T 15/00 345/420 |
| 2013/0051676 A1* | 2/2013 | Wehnes | G06T 7/0012 382/190 |
| 2014/0028673 A1* | 1/2014 | Gregson | G06T 17/20 345/420 |
| 2014/0355843 A1* | 12/2014 | Da | G06K 9/00214 382/118 |
| 2015/0015577 A1* | 1/2015 | Mason | G06T 17/10 345/420 |
| 2016/0012629 A1* | 1/2016 | Jennings | G06T 15/04 345/420 |
| 2016/0117858 A1* | 4/2016 | Wu | G06T 11/20 345/420 |
| 2016/0221404 A1 | 8/2016 | Lee et al. | |
| 2016/0379406 A1* | 12/2016 | Le Geyt | G06T 17/205 345/420 |
| 2017/0039731 A1* | 2/2017 | Liu | G06T 7/60 |
| 2018/0000342 A1* | 1/2018 | Tang | G06T 7/0014 |
| 2018/0101719 A1* | 4/2018 | Schickel | G06T 17/00 |

FOREIGN PATENT DOCUMENTS

| | | |
|---|---|---|
| KR | 1117045 B | 2/2012 |
| KR | 1534259 B | 7/2015 |

* cited by examiner

STR21

STR22

STR23

STR41

STR42

STR43

STR51

STR52

METHODS OF AND DEVICES FOR REDUCING STRUCTURE NOISE THROUGH SELF-STRUCTURE ANALYSIS

CROSS-REFERENCE TO RELATED APPLICATION

This U.S. non-provisional patent application claims priority under 35 USC § 119 to Korean Patent Application No. 10-2016-0165559, filed on Dec. 7, 2016 in the Korean Intellectual Property Office (KIPO), the disclosure of which is incorporated by reference in its entirety herein.

BACKGROUND

1. Technical Field

Example embodiments of the present disclosure relate generally to noise reduction. More particularly, example embodiments of the present disclosure relate to methods of and devices for reducing structure noise through self-structure analysis.

2. Discussion of the Related Art

Data representing a two-dimensional or three-dimensional structure may include noise. It is not easy to separate and remove the structure noise or errors from the original structure data. The removal of structure noise may significantly increase processing time for processing the structure data.

SUMMARY

Some example embodiments of the present disclosure may provide a method and a device for efficiently reducing structure noise through self-structure analysis. The self-structure analysis may be provided by, for example, analyzing (evaluating, processing etc.) input data of a structure to identify and remove noise in the input data of the structure. The self-structure analysis may be performed without requiring additional input beyond the input data.

Some example embodiments of the present disclosure may provide an electronic system of executing program routines of efficiently reducing structure noise through self-structure analysis.

According to example embodiments of the present disclosure, a method of reducing structure noise includes obtaining input data representing an input structure. The method also includes setting boundary conditions by classifying data of each of multiple structure elements of the input data as a signal component or a noise component. A smoothing operation is performed with respect to the input data based on the boundary conditions. Output data representing an output structure is provided by reducing noise from the input structure.

According to example embodiments, a device for reducing structure noise includes a controller configured to set boundary conditions by classifying data of each of multiple structure elements of the input data as a signal component or a noise component based on input data representing an input structure. A smoothing element (e.g., a processor, a circuit or other component(s)) of the device is configured to perform a smoothing operation with respect to the input data based on the boundary conditions and to provide output data representing an output structure by reducing noise from the input structure.

According to example embodiments of the present disclosure, a computer-based electronic system for reducing structure noise includes an input device, a memory device, an output device and a processor. The input device is configured to receive input data representing an input structure. The memory device is configured to store information including program routines. When executed, the program routines set boundary conditions by classifying data of each of multiple structure elements of the input data as a signal component or a noise component, perform a smoothing operation with respect to the input data based on the boundary conditions. and provide output data representing an output structure by reducing noise from the input structure based on the classifying of the noise components. The output device is configured to display the input structure and the output structure. The processor is connected to the input device, the output device and the memory device. The processor is configured to control an execution of the program routines.

The method and device according to example embodiments of the present disclosure may reduce structure noise efficiently with respect to an arbitrary input structure without requiring additional information on the signal components of the input structure by analyzing the data of the input structure itself to set the boundary condition and by separating the noise from the data of the valid structure. In addition, in comparison with conventional schemes of reducing noise by adding structure elements, the method and device according to example embodiments of the present disclosure may reduce the structure noise with a decreased data processing time by sequentially removing data of structure elements to simultaneously remove the errors in the data of the input structure.

BRIEF DESCRIPTION OF THE DRAWINGS

Example embodiments of the present disclosure will be more clearly understood from the following detailed description taken in conjunction with the accompanying drawings.

FIGS. 18A, 18B and 14C are diagrams illustrating an example result of a noise reduction according to the method of FIG. 15.

DETAILED DESCRIPTION OF THE EMBODIMENTS

Figure 1:
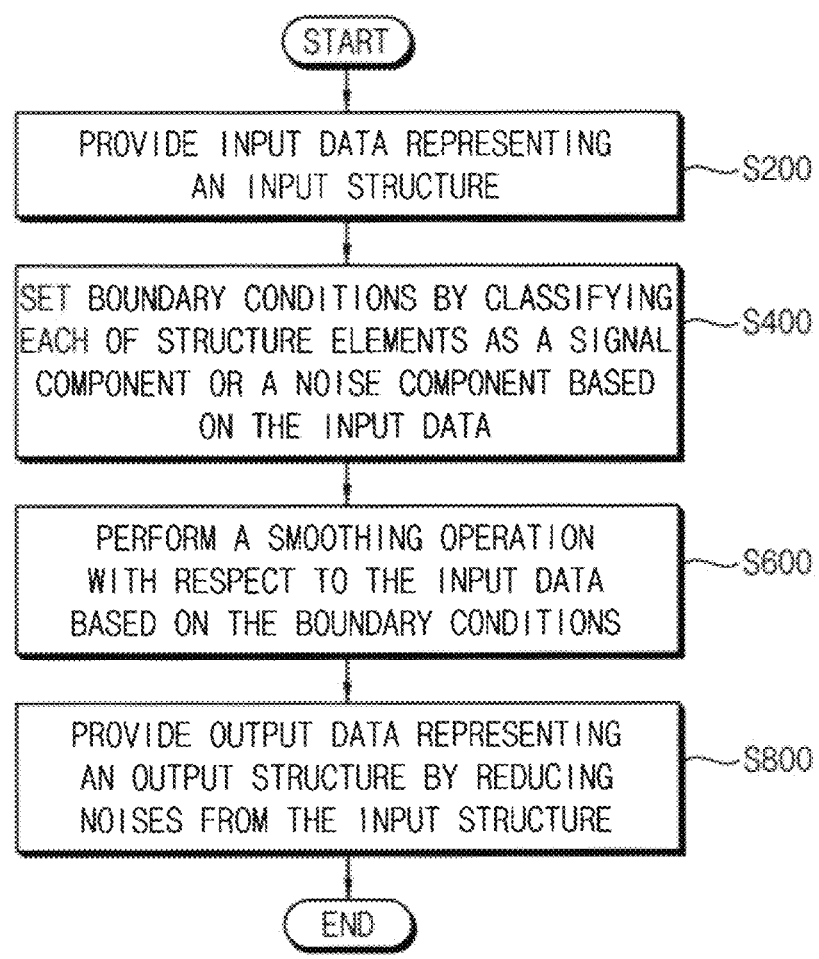
FIG. 1 is a flow chart illustrating a method of reducing structure noise according to example embodiments of the present disclosure.

Various example embodiments of the present disclosure will be described more fully hereinafter with reference to the accompanying drawings, in which some example embodiments are shown. In the drawings, like numerals refer to like elements throughout. The repeated descriptions may be omitted.

FIG. 1 is a flow chart illustrating a method of reducing structure noise according to example embodiments of the present disclosure.

Referring to FIG. 1, input data representing an input structure is provided (S200). The input data may be obtained, received, collected, or input. The input data may be received over a link, or a network, or may be retrieved from a computer readable medium. As used herein, the input data may be referred to interchangeably as the input structure, since the input data represents the input structure. The input structure may be a two-dimensional structure or a three-dimensional structure and the input structure may be provided through various methods. In some example embodiments, the input data may be generated by an electronic design automation (EDA) tool. In other example embodiments, the input data may be provided by processing image data that is captured using an image sensor. In still other example embodiments, the input data may be provided by restructuring data using a computer vision. The method of providing the input data is not limited thereto and the input data may be provided through other various methods.

Boundary conditions are set by classifying data of each of multiple structure elements of the input data as a signal component or a noise component based on the input data (S400). The two-dimensional or three dimensional input structure may be a figure having a shape that is divided by polyhedrons. The two-dimensional input structure may be composed of structure elements of vertexes, edges and faces. The three-dimensional input structure may be composed of structure elements of vertexes, edges, faces and solids. The input data of the structure may include signal components reflecting correct structure information and noise components corresponding to errors caused during processes of generating the representation of the structure.

Due to the noise components, the number of the structure elements may be increased significantly. Thus, a calculation amount may be increased. The noise components may have a complex local shape. Additionally, the noise components may cause or reflect the existence of structural errors such as a cross of faces. In these cases, errors may be caused during processes of removing noise and a probability of structure distortion may be increased.

This disclosure provides example embodiments of methods of and devices for removing or reducing the structure noise that are caused in the data of the representation of the two-dimensional or three-dimensional structure. As used herein, the removal may be described as removal of a structural element such as an edge or as removal of data element of a structural element such an edge. It should be understood that data described herein is representative of a two-dimensional or three-dimensional structure, such that removal of a structural element corresponds to removal of data of the structural element. Thus, removal of a structural element may be described interchangeably with removal of data of a structural element. To reduce loss of structure in the representation during the noise removal process, the input data itself is analyzed without additional information on the input structure to classify data of each of the structure elements of the input data as the signal component or the noise component. Example embodiments of setting the boundary conditions based on the input data will be described below with reference to FIGS. 4 through 9.

A smoothing operation is performed with respect to the input data based on the boundary conditions (S600). Output data representing an output structure is provided by reducing noise from the input structure (S800).

The smoothing operation may be performed variously. For example, the smoothing operation may be performed by a restructuring method using a surface energy minimization. The structure calculation based on the surface energy minimization is used mainly in a field of material science, which is applied to a grain growth of polycrystalline material, a solder shape of packaging material, a fluid shape prediction, etc. The example embodiments of the smoothing operation will be described below with reference to FIGS. 20A, 20B and 20C.

In conventional schemes, structure noise is removed by additionally dividing the structure elements to apply an average of coordinates of the adjacent vertexes, or by applying a function to vertex coordinates during structure modification to prevent noise generation. However, in these schemes, the noise component may be maintained and the signal component may be distorted because the structure modification is performed without differentiating the signal component and the noise component.

Particularly, if the structure modification is applied repeatedly to a severely projected noise component, the vulnerable signal component near the severely projected noise component may be distorted before the removal of the noise component. The calculation error between the distorted structure elements may increase the structure noise. Additionally, the processing time may be increased by the increased structure elements used in interpolation of structure. The scheme of removing noise using a structure function requires that the signal components should be defined as a function in advance. Thus, the scheme may be applied to a structure of limited shapes.

The smoothing operation based on the surface energy minimization is effective in removing a projected noise but it does not differentiate the signal component and the noise component. Thus, the above-mentioned problems such as the structure distortion, the increase of the processing time, etc. may be caused as the smoothing operation is repeated.

The method according to example embodiments of the present disclosure may reduce structure noise efficiently with respect to an arbitrary input structure without requiring additional information on the signal components of the input structure. The structure noises may be reduced by analyzing the input structure itself to set the boundary condition and by separating the noise from the data of the valid structure.

The structure with the noise reduced or removed can be reproduced for display as a model. The model may be electronically reproduced in an image or video, and shown to a viewer as a visualization of the underlying structure. As will be explained herein, this may provide an accurate visualization of extraordinarily complex structures that would potentially not be comprehensible to a user viewing the representation of the structure configured without excluding the noise.

Figure 2:
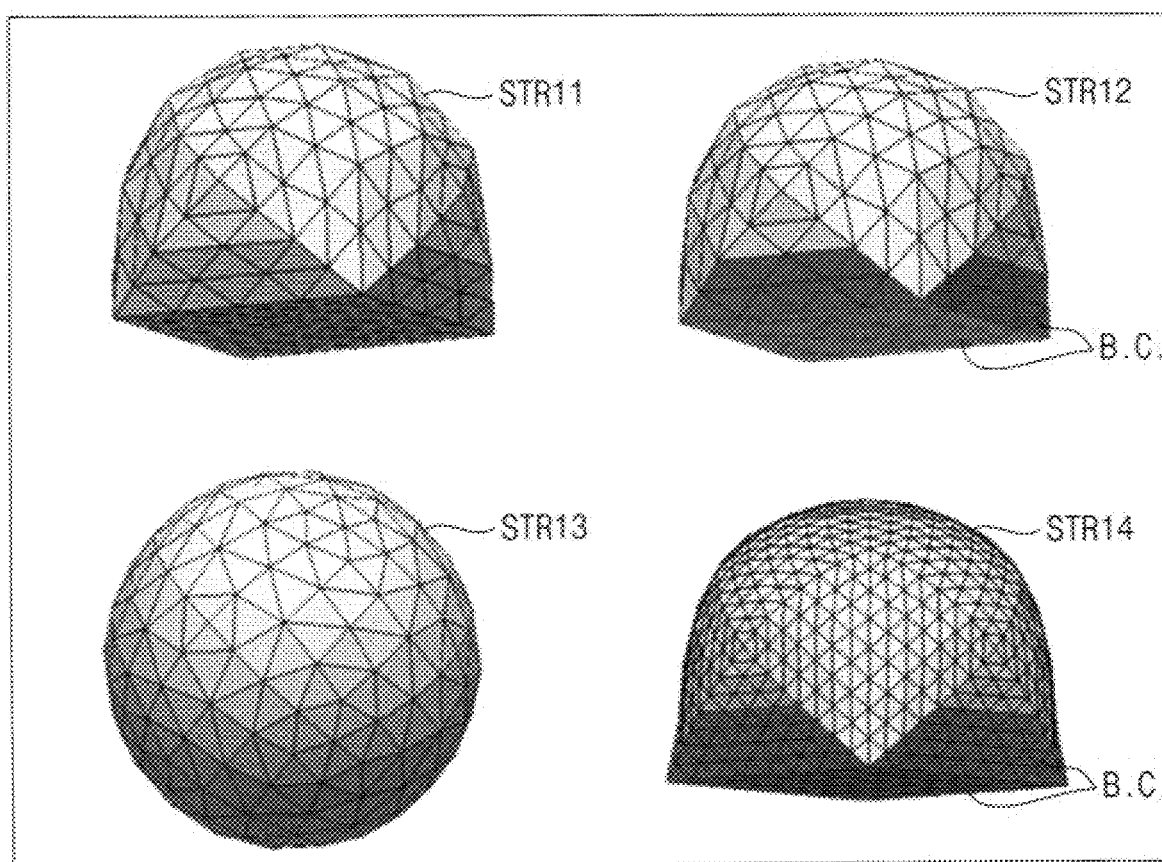
FIG. 2 is a diagram for describing structure noise removal by setting boundary conditions.

FIG. 2 is a diagram for describing structure noise removal by setting boundary conditions.

In FIG. 2, a first structure STR11 represents an example input structure and a second structure STR12 is the same as the first structure STR11 but boundary conditions (B.C.) are set to the second structure STR12. A third structure STR13 represents an output structure corresponding to a result of performing the smoothing operation with respect to the first structure STR11 without the boundary conditions and a fourth structure STR14 represents an output structure corresponding to a result of performing the smoothing operation with respect to the second structure STR12 with the boundary conditions.

As represented by the third structure STR13, if the boundary conditions are not set, the first structure STR11 may be distorted to a sphere by the smoothing operation. In contrast, as represented by the fourth structure STR14, if the boundary conditions are set, the original shape of the second shape STR2 is maintained.

Figure 3:
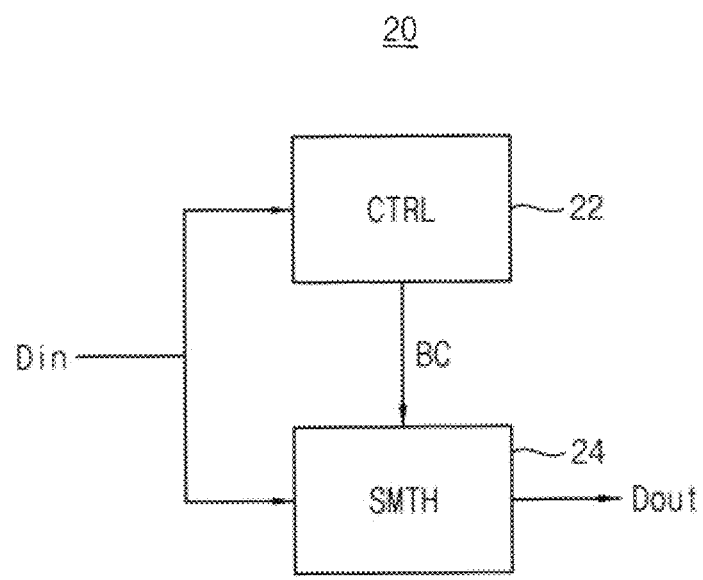
FIG. 3 is a block diagram illustrating a device for reducing structure noise according to example embodiments of the present disclosure.

FIG. 3 is a block diagram illustrating a device for reducing structure noise according to example embodiments of the present disclosure.

Referring to FIG. 3, a device 20 for reducing structure noise may include a control unit CTRL 22 and a smoothing unit SMTH 24. As described herein, the control unit 22 and the smoothing unit 24 may be individual processors, circuits or other forms of hardware capable of executing software. Alternatively, the control unit 22 and the smoothing unit 24 may be a combination of one or more elements of hardware such as processors and corresponding units of software executed by the elements of hardware.

The control unit 22 may set boundary conditions BC by classifying data of each of multiple structure elements of the input data as a signal component or a noise component based on input data Din representing an input structure. As described above, the two-dimensional or three dimensional input structure represented by the input data Din may be a figure having a shape that is divided by polyhedrons. The two-dimensional input structure may be composed of structure elements of vertexes, edges and faces. The three-dimensional input structure may be composed of structure elements of vertexes, edges, faces and solids. Example embodiments of setting the boundary conditions BC based on the input data Din will be described below with reference to FIGS. 4 through 9.

The smoothing unit 24 may perform a smoothing operation with respect to the input data Din based on the boundary conditions BC, and provide output data Dout representing an output structure by reducing noise from the input structure Din. The smoothing unit 24 may be implemented variously. For example, the smoothing unit 24 may perform the smoothing operation by a restructuring method using a surface energy minimization. The example embodiments of the smoothing operation performed by the smoothing unit 24 will be described below with reference to FIGS. 20A, 20B and 20C.

As will be appreciated by one skilled in the art, embodiments of the device 20 and the method of reducing the structure noise may be implemented with hardware, software or a combination of hardware and software. For example, the device 20 may be implemented using a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

Figure 4:
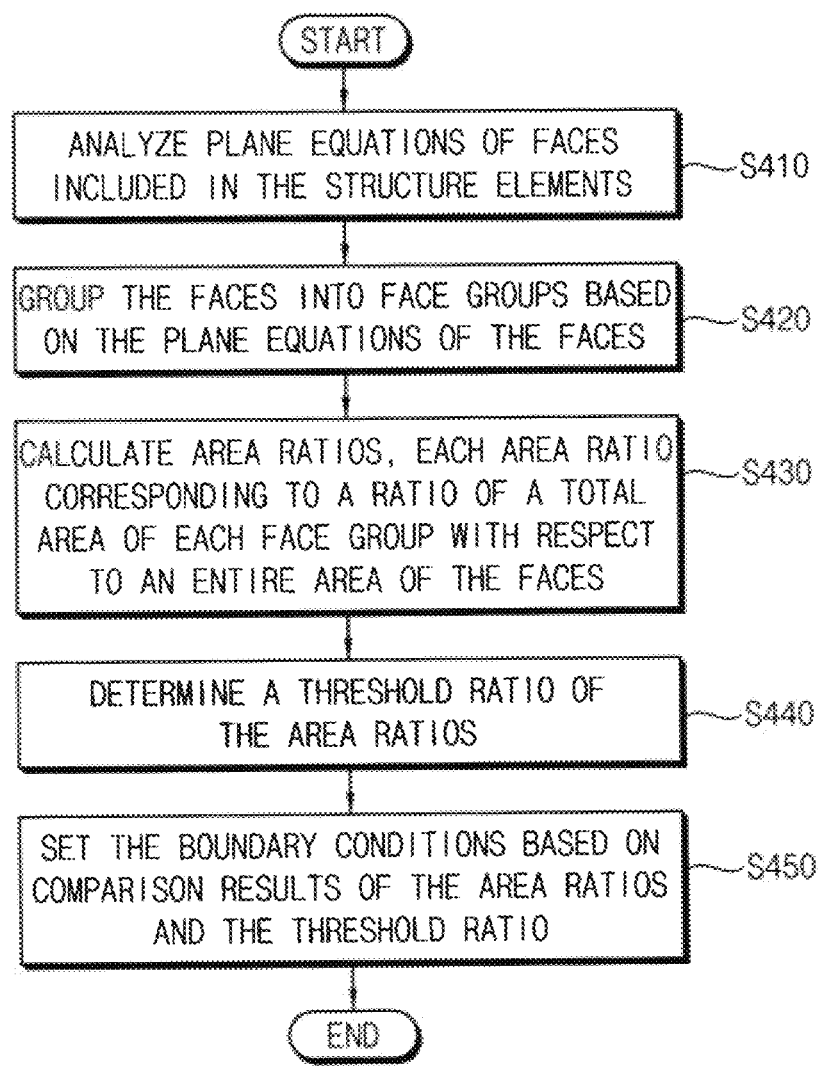
FIG. 4 is a flow chart illustrating an example embodiment of setting boundary conditions included in the method of FIG. 1.
Figure 5:
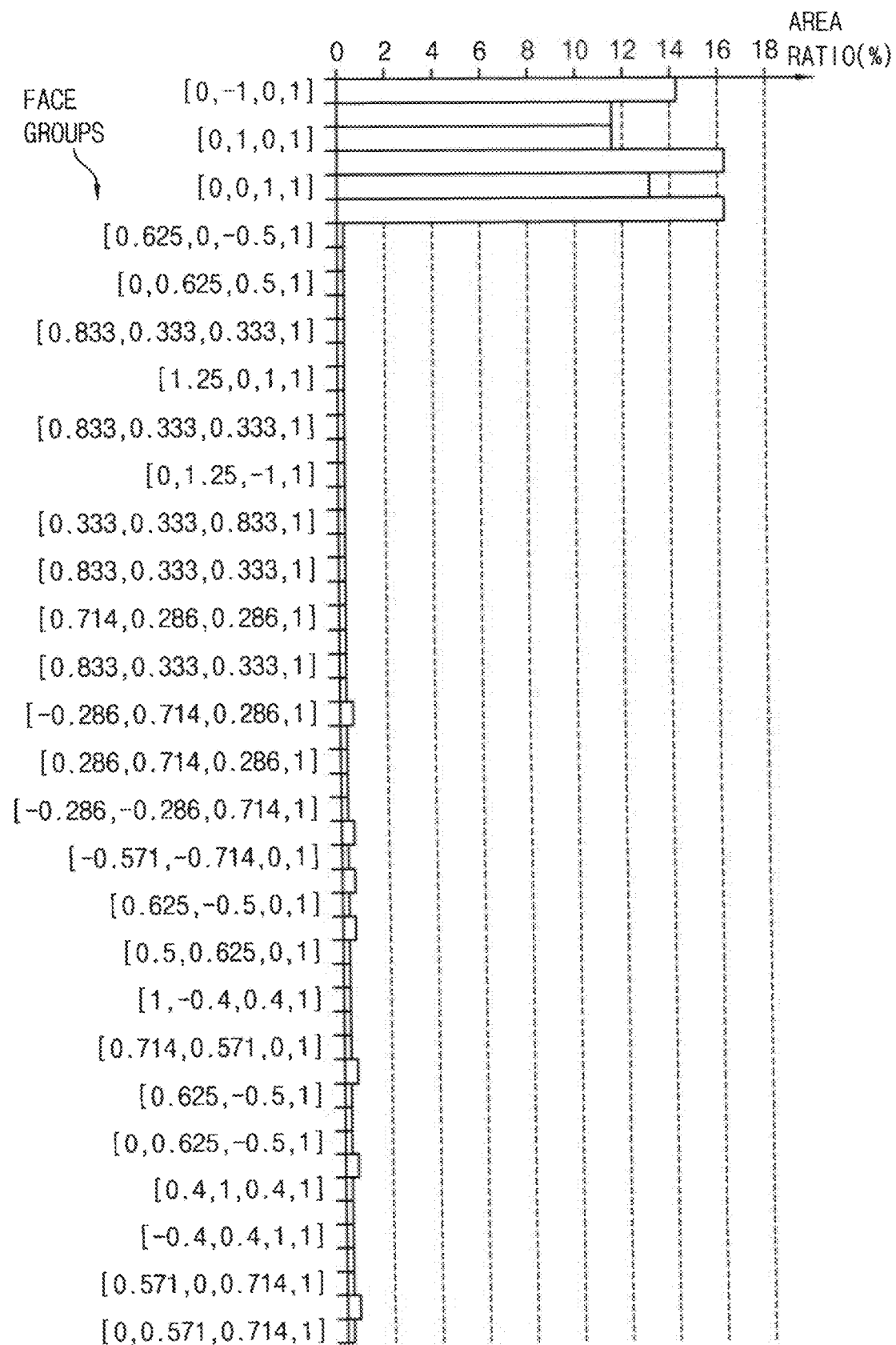
FIG. 5 is a diagram illustrating an example of face groups and area ratios for setting boundary conditions of FIG. 4.
Figure 6:
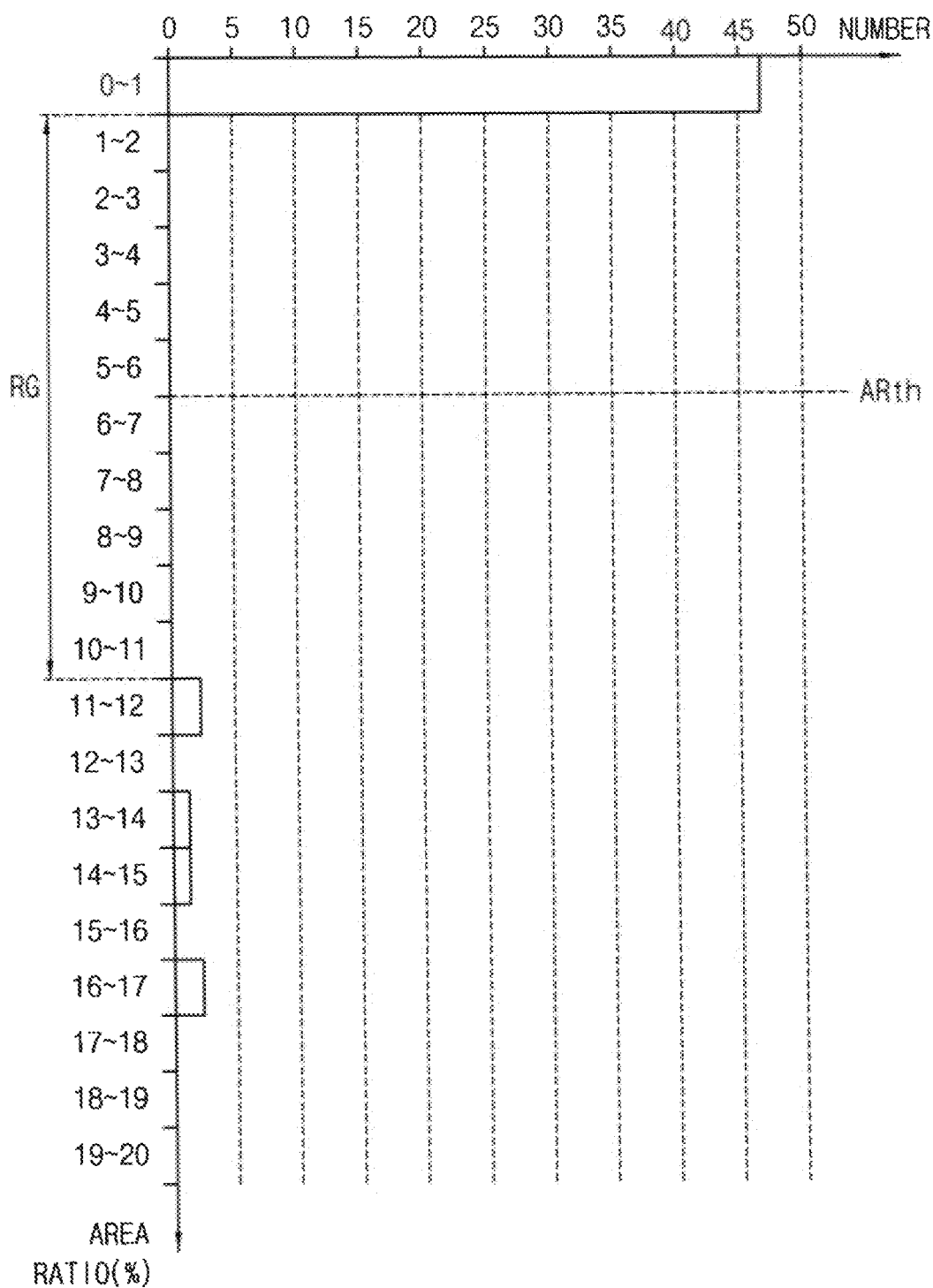
FIG. 6 is a diagram illustrating an example embodiment of determining a threshold ratio for setting boundary conditions of FIG. 4.

FIG. 4 is a flow chart illustrating an example embodiment of setting boundary conditions included in the method of FIG. 1. FIG. 5 is a diagram illustrating an example of face groups and area ratios for setting boundary conditions of FIG. 4. FIG. 6 is a diagram illustrating an example embodiment of determining a threshold ratio for setting boundary conditions of FIG. 4.

Referring to FIGS. 3 and 4, the control unit 22 of the device 20 may analyze plane equations of faces included in the structure elements based on the input data Din (S410). The plane equation may be represented as Equation1.

$$ax+by+cz+d=0 \text{ or } (a/d)x+(b/d)y+(c/d)z+1=0 \qquad \text{Equation1}$$

In Equation1, x, y and z indicate coordinates of a vertex included in or defining a corresponding plane and a, b, c and d indicate coefficients of the plane equation. By Equation1, three vertexes may define one plane.

The control unit 22 may group the faces into face groups based on the plane equations of the faces (S420). The face groups may be represented by a combination of the coefficients of the plane equation, that is, [a, b, c, d] or [a/d, b/d, c/d, 1]

The control unit 22 may calculate area ratios such that each area ratio corresponds to a ratio of a total area of each face group with respect to an entire area of the faces (S430). The area ratio of each face group may be represented by Equation2.

$$ARi = AGi/AE \qquad \text{Equation2}$$

In Equation2, ARi indicates the area ratio of the i-th face group, AGi indicates the total area of the faces included in the i-th face group and AE indicates the entire area of all faces included in the input structure.

FIG. 5 illustrates an example of face groups and area ratios. The example of the face groups and the area ratios in FIG. 5 corresponds to an example input structure STR21 in FIG. 7A. In FIG. 5, a vertical axis represents the face groups as [a/d, b/d, c/d, 1] and a horizontal axis represents the area ratio in percentage % of the corresponding face group. The input structure STR21 in FIG. 7A has a rectangular shape. Thus, as illustrated in FIG. 5, the six area ratios corresponding to the six faces of the rectangle may be greater than the area ratios of the other face groups.

Referring back to FIGS. 3 and 4, the control unit 22 may determine a threshold ratio ARth of the area ratios. In some example embodiments, the control unit 22 may determine the threshold ratio based on a distribution of numbers of the face groups having the respective area ratios.

FIG. 6 illustrates an example embodiment of determining a threshold ratio based on the distribution of the numbers of the face groups having the respective area ratios. As illustrated in FIG. 6, significantly more of the face groups have relatively small area ratios between 0% through 1% than the relatively great area ratios between 11% through 17%. That is, there are more face groups having area ratios below 1% than there are having area ratios between 11% and 17%.

In some example embodiments, a range RG of the area ratios may be obtained such that the numbers of the face groups in the range RG are zero continuously and a center value of the range RG of the area ratios may be determined as the threshold ratio ARth. In case of FIG. 6, the range RG includes the area ratios between 1% through 11%, and the center value of 6% of the range RG may be determined as the threshold ratio ARth.

In other example embodiments, the threshold ratio Arth may be accepted from a user who determined the threshold ratio based on the distribution of numbers of the face groups having the respective area ratios. A system as will be described below with reference to FIG. 25 may include input-output devices such as a display, a keyboard, a mouse, a touch screen, etc. The device 20 of FIG. 3 may show the distribution of the numbers of the face groups to the user through the output devices such as a display, and the user may determine a proper value of the threshold ratio ARth referring to the input structure of FIG. 7A.

Referring back to FIGS. 3 and 4, the control unit 22 may set the boundary conditions BC based on comparison results of the area ratios and the threshold ratio ARth (S450). Setting of the boundary conditions BC will be described below with reference to FIGS. 8 and 9.

Figure 7A:
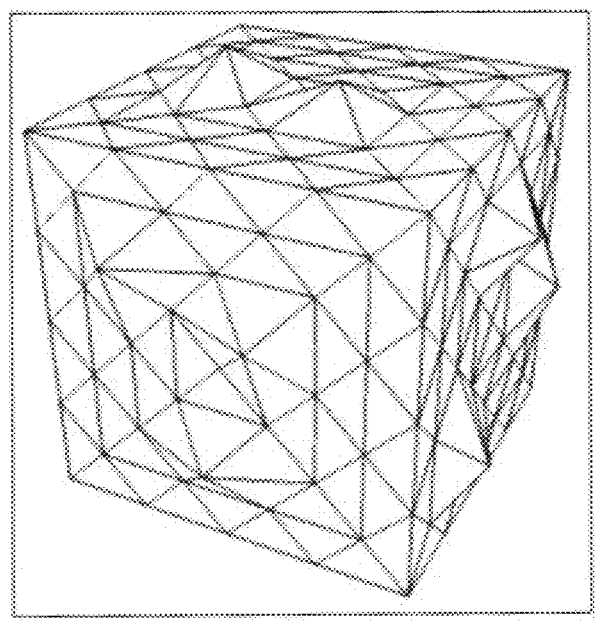
FIGS. 7A, 7B and 7C are diagrams illustrating an example result of a noise reduction according to the method of FIG. 1.
Figure 7B:
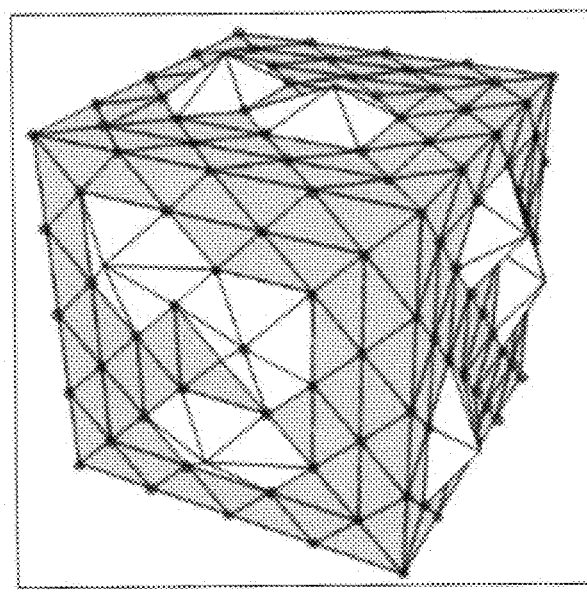
Figure 7C:
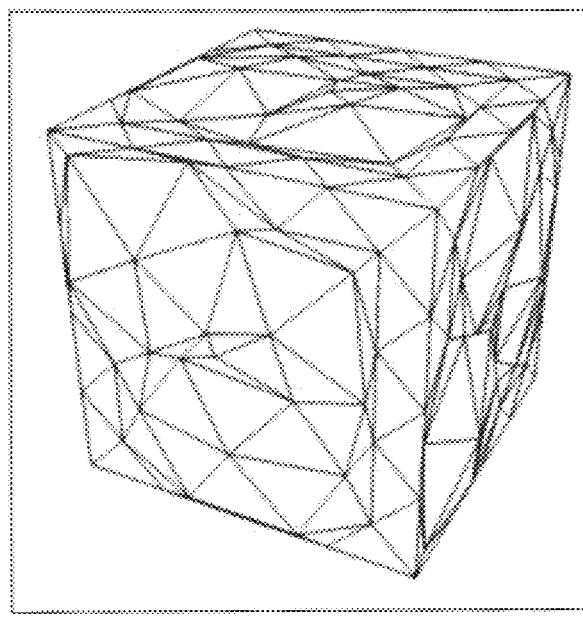

FIGS. 7A, 7B and 7C are diagrams illustrating an example result of a noise reduction according to the method of FIG. 1.

FIG. 7A illustrates an example input structure STR21. FIG. 7B illustrates an input structure STR22 to which boundary conditions are set. FIG. 7C illustrates an output structure STR23 corresponding to a result of performing the smoothing operation with respect to the input structure STR22 with the boundary conditions.

The boundary conditions set based on the comparison result of the area ratios of the face groups and the threshold ratio as described with reference to FIGS. 5 and 6 are represented in FIG. 7B. In FIG. 7B, the shaded triangular meshes correspond to the signal components and the not-shaded triangular meshes correspond to the noise components. The triangular meshes correspond to the above-mentioned faces and each triangular mesh includes three edges and three vertexes.

In the conventional methods based on the surface energy minimization, the user has to assign a function (e.g., z=sin(x)), a coordinate (e.g., y=0) and/or a condition (e.g., if distance(body1, body2)<0.1) as the boundary conditions giving restriction to the structure modification. However, the boundary conditions may be determined by analyzing the input data itself according to example embodiments. For example, the plane equations of the faces are analyzed to group the faces and the areas of the faces in each face group are summed to obtain each area ratio. The faces in each face group may be classified as the signal components if the area ratio is greater than the threshold ratio ARth, and may be classified as the noise components if the area ratio is smaller than the threshold ratio ARth. The boundary conditions or the constraints may be set such than the structure elements of the face classified as the signal component may move only on the face while the smoothing operation is performed. In contrast, the structure elements of the face classified as the noise component may move freely to be effected by the structure modification for the surface energy minimization.

Figure 8:
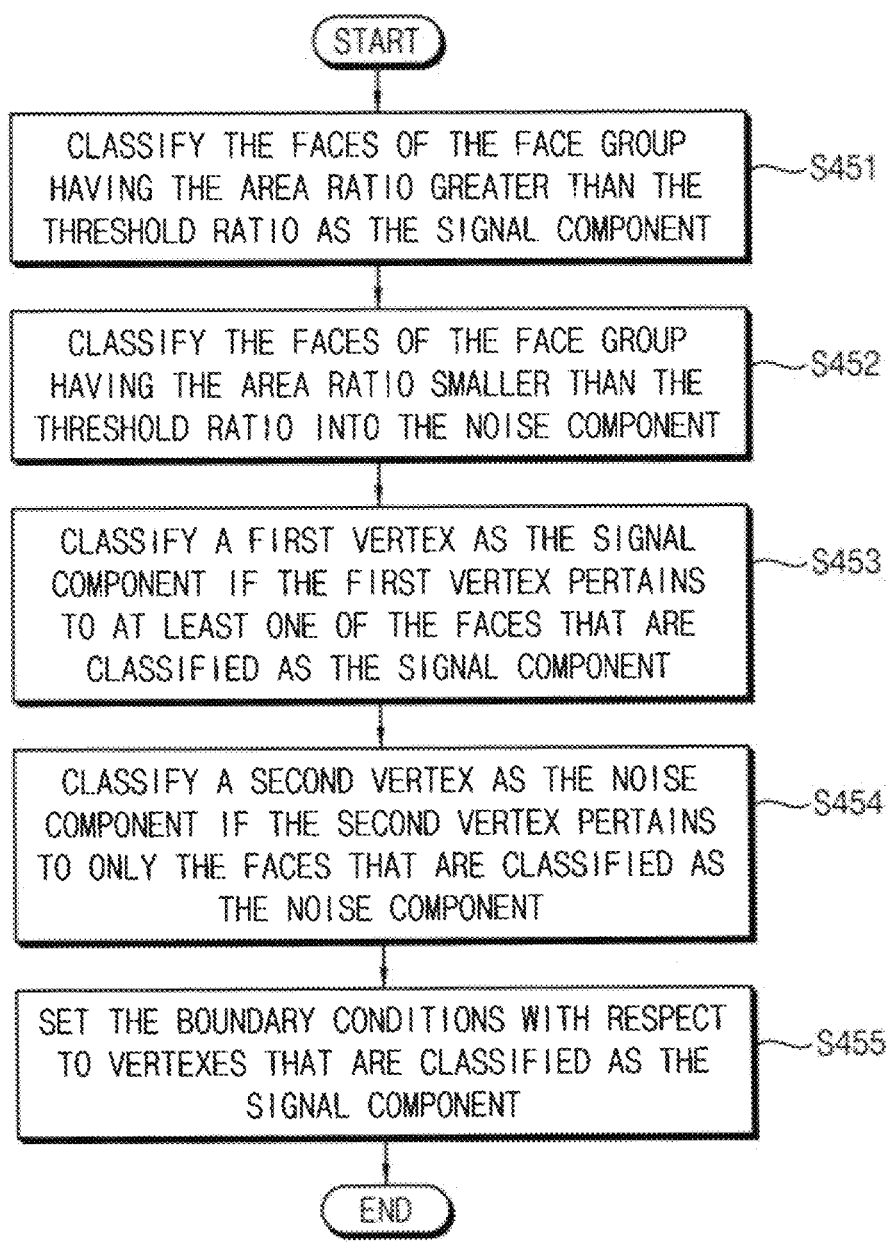
FIG. 8 is a flow chart illustrating an example embodiment of setting boundary conditions based on a result of comparing an area ratio and a threshold ratio.
Figure 9:
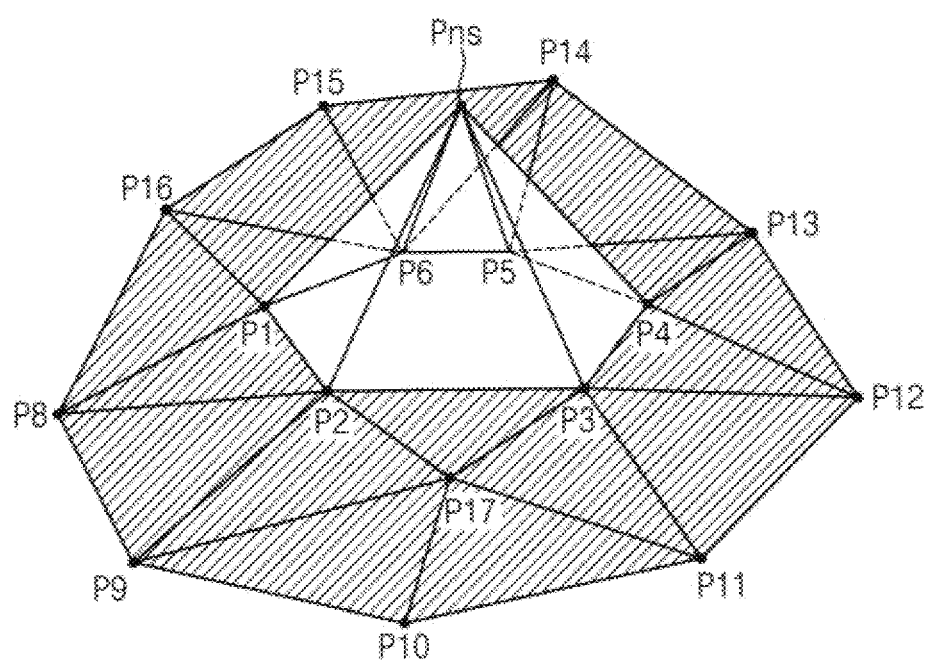
FIG. 9 is a diagram for describing a process of setting boundary conditions of FIG. 8.

FIG. 8 is a flow chart illustrating an example embodiment of setting boundary conditions based on a result of comparing an area ratio and a threshold ratio. FIG. 9 is a diagram for describing a process of setting boundary conditions of FIG. 8.

Referring to FIGS. 3 and 8, the control unit 22 may set the boundary conditions based on the comparison result of Equation3.

$$ARi > ARth \qquad \text{Equation3}$$

The control unit 22 may classify the faces as the signal components if the face group has the area ratio ARi greater than the threshold ratio ARth (S451). In contrast, the control unit 22 may classify the faces as the noise components if the face group has the area ratio ARi equal to or smaller than the threshold ratio ARth (S452).

FIG. 9 illustrates an example of the signal components and the noise components that are classified as described above. In FIG. 9, the shaded triangular meshes correspond to the signal components and the not-shaded triangular meshes correspond to the noise components.

Referring to FIGS. 8 and 9, the control unit 22 may classify a vertex as the signal component if the vertex pertains to at least one of the faces that are classified as the signal component (S453). In contrast, the control unit 22 may classify a vertex as the noise component if the vertex pertains to only the faces that are classified as the noise component (S454). In the example of FIG. 9, only one vertex Pns pertains to only the faces that are classified as the noise component and the other vertexes P1 through P16 pertain to at least one of the faces that are classified as the signal component. Thus the vertex Pns may be classified as the noise component whereas the other vertexes P1 through P16 may be classified as the signal components.

After all of the vertexes are classified as the signal component or the noise component, the control unit 22 may set the boundary conditions with respect to the vertexes that are classified as the signal component. For example, the boundary conditions or the constraints may be set such than the vertex classified as the signal component may move on the face while the smoothing operation such as the surface energy minimization is performed. In contrast, the structure elements of the face classified as the noise component may move freely to be effected by the structure modification for the surface energy minimization.

Figure 10:
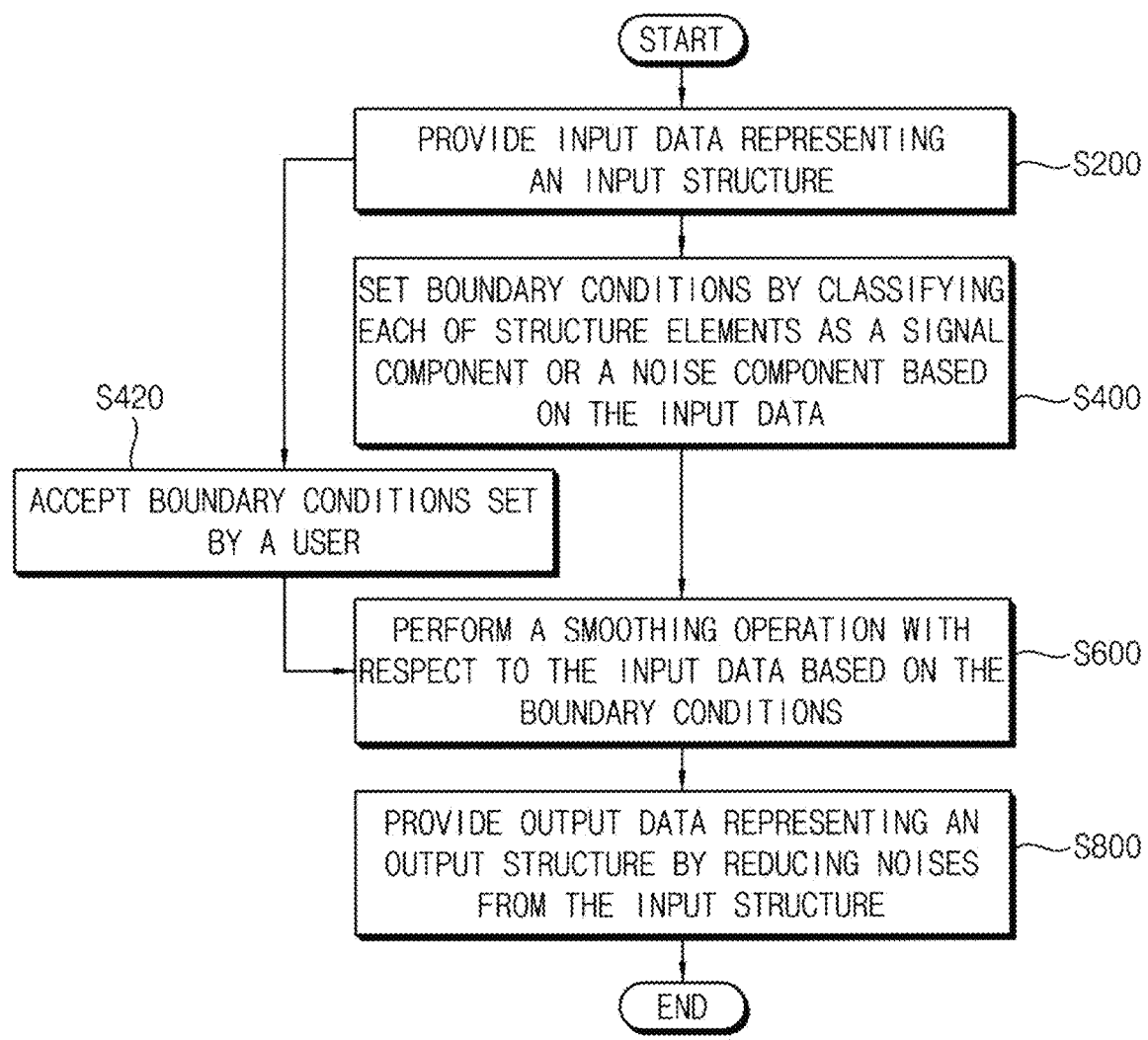
FIG. 10 is a flow chart illustrating a method of reducing structure noise according to example embodiments of the present disclosure.

FIG. 10 is a flow chart illustrating a method of reducing structure noise according to example embodiments of the present disclosure.

Referring to FIG. 10, input data representing an input structure is provided (S200). Boundary conditions are set by classifying data of each of multiple structure elements of the input data as a signal component or a noise component (S400). In addition to setting the boundary conditions based on the input data, the boundary conditions may be accepted as settings from a user (S420). A smoothing operation is performed with respect to the input data based on the boundary conditions (S600). Output data representing an output structure is provided by reducing noise from the input structure (S800).

The processes S200, S400, S600 and S800 of the method of FIG. 10 are the same as those of FIG. 1. Thus, the repeated descriptions are omitted.

This disclosure is for providing example embodiments of methods of and devices for removing or reducing the structure noise that are caused in the data of the two-dimensional or three-dimensional structure. To reduce loss of structure during the noise removal process, the input data itself is analyzed without additional information on the input structure to classify data of each of the structure elements of the input data as the signal component or the noise component. As described with reference to FIGS. 4 through 9, the boundary conditions may be set based on the input data.

In addition to setting of the boundary conditions automatically based on the input data, the boundary conditions may be determined by a user based on the user's judgement or based on additional information on the input structure. The boundary conditions based on the input data and the user's boundary conditions may compensate for each other to contribute to the efficient execution of the structure noise reduction.

Figure 11:
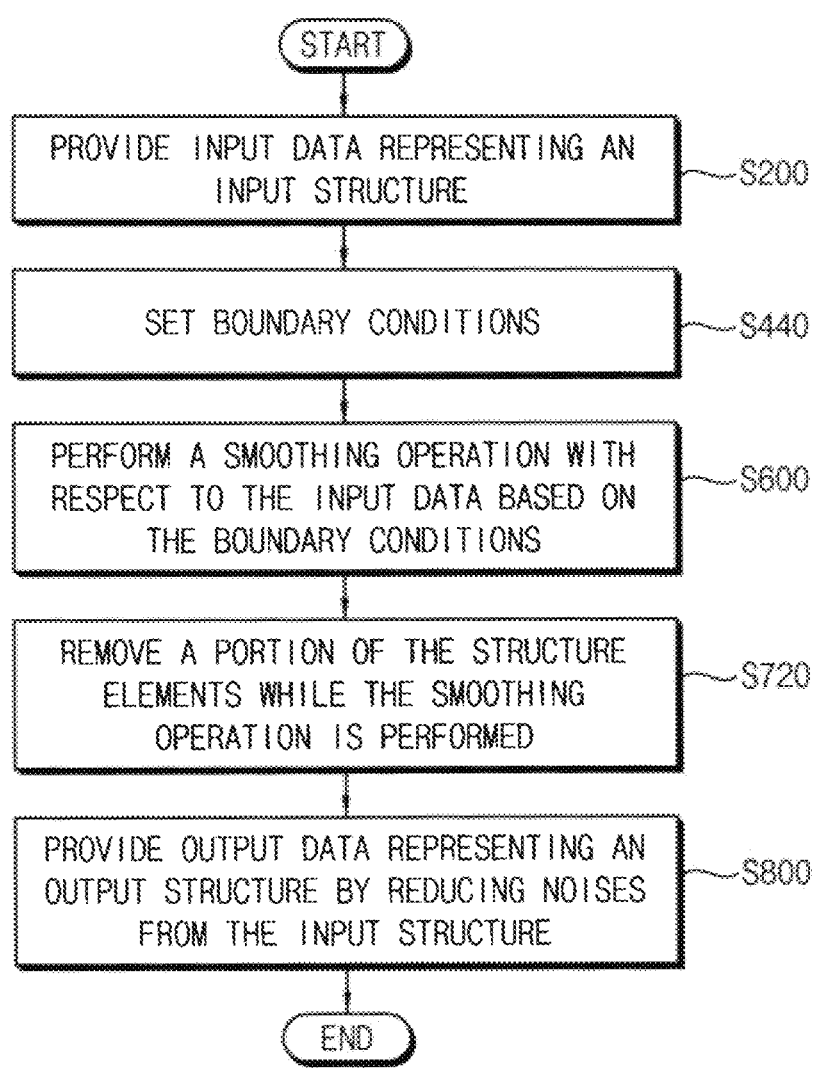
FIG. 11 is a flow chart illustrating a method of reducing structure noise according to example embodiments of the present disclosure.

FIG. 11 is a flow chart illustrating a method of reducing structure noise according to example embodiments of the present disclosure.

Referring to FIG. 11, input data representing an input structure is provided (S200). The input structure may be a two-dimensional structure or a three-dimensional structure and the input structure may be provided through various methods. In some example embodiments, the input data may be generated by an electronic design automation (EDA) tool. In other example embodiments, the input data may be provided by processing image data that is captured using an image sensor. In still other example embodiments, the input data may be provided by restructuring data using a computer vision. The method of providing the input data is not limited thereto and the input data may be provided through other various methods.

Boundary conditions are set (S440). In some example embodiments, the boundary conditions may be set by classifying data of each of multiple structure elements of the input data as a signal component or a noise component. In other example embodiments, the boundary conditions may be accepted from a user. In still other example embodiments, the boundary conditions may be set by classifying the structure elements with the settings accepted as input from the user.

The two-dimensional or three dimensional input structure may be a figure having a shape that is divided by polyhedrons. The two-dimensional input structure may be composed of structure elements of vertexes, edges and faces. The three-dimensional input structure may be composed of structure elements of vertexes, edges, faces and solids. The input structure may include signal components reflecting correct structure information and noise components corresponding to errors caused during processes of generating the structure.

A smoothing operation is performed with respect to the input data based on the boundary conditions (S600). Data of a portion of the structure elements is removed while the smoothing operation is performed (S720). After the smoothing operation accompanying the removal of the data of the structure elements, output data representing an output structure is provided by reducing noise from the input structure (S800). The smoothing operation accompanying the removal of the data of the structure elements will be described below with reference to FIGS. 12 through 14B.

In conventional schemes, the structure noise has been removed by additionally dividing the structure elements to apply an average of coordinates of the adjacent vertexes, or by applying a function to vertex coordinates during structure modification to prevent noise generation. However, in these schemes, the noise component may be maintained and the signal component may be distorted because the structure modification is performed without differentiating the signal component and the noise component.

Particularly if the structure modification is applied repeatedly to a severely projected noise component, the vulnerable signal component near the severely projected noise component may be distorted before the removal of the noise component. The calculation error between the distorted structure elements may increase the structure noise. Additionally, the processing time may be increased by the increased structure elements used in interpolation of structure. The scheme of removing noise using a structure function requires that the signal components should be defined as a function in advance. Thus, the scheme may be applied to a structure of limited shapes.

The smoothing operation based on the surface energy minimization is effective in removing a projected noise but it does not differentiate the signal component and the noise component. Thus, the above-mentioned problems such as the structure distortion, the increase of the processing time, etc. may be caused as the smoothing operation is repeated.

The method according to example embodiments of the present disclosure may reduce structure noise efficiently with respect to an arbitrary input structure without requiring additional information on the signal components of the input structure. Structure noises are reduced in this way by analyzing the input structure itself to set the boundary condition, and by separating the noise from the data of the valid structure.

Due to the noise components, the number of the structure elements may be increased significantly. Thus, a calculation amount may be increased. The noise components may have a complex local shape. Additionally, the noise components may cause or reflect the existence of structural errors such as a cross of faces. In these cases, errors may be caused during processes of removing noise, and a probability of structure distortion may be increased.

The noise component may transfer wrong information of the distorted structure and also affect the time of the operation (e.g., a Boolean operation) for removing the structure noise. As the number of the structure elements is increased, the operation time or the data processing time is increased and a probability of reducing the noise is decreased. For the reliable data processing, the signal components should be maintained and the noise components should be removed as much as possible. In addition, the number of the structure elements should not be increased to enhance efficiency of the noise reduction, because the data processing time is increased and the probability of reducing the noise is decreased as the number of the structure elements is increased.

The method and device according to example embodiments may reduce structure noise efficiently with respect to an arbitrary input structure without requiring additional information on the signal components of the input structure by analyzing the input structure itself to set the boundary condition and by separating the noise from the data of the valid structure.

In addition, in comparison with conventional schemes of reducing noise by adding structure elements, the method and device according to example embodiments may reduce the structure noise with a decreased data processing time by sequentially removing data of structure elements to simultaneously remove the errors in the input structure.

Figure 12:
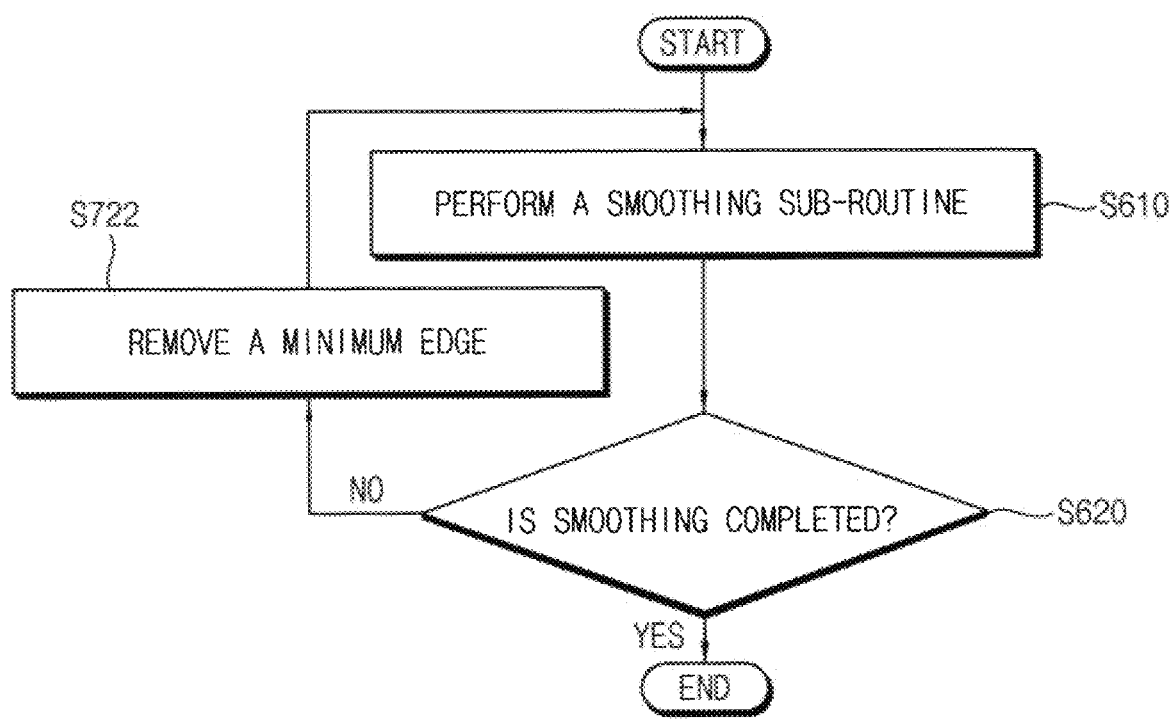
FIG. 12 is a flow chart illustrating an example embodiment of performing a smoothing operation and removing data of a portion of structure elements included in the method of FIG. 11.

FIG. 12 is a flow chart illustrating an example embodiment of performing a smoothing operation and removing data of a portion of structure elements included in the method of FIG. 11.

Referring to FIGS. 3 and 12, the smoothing unit 24 performs a smoothing sub-routine (S610). The above mentioned smoothing operation may be performed such that the smoothing sub-routine is repeatedly executed based on input data representing a structure and boundary conditions.

The smoothing operation may be performed variously. For example, the smoothing operation may be performed by a restructuring method using a surface energy minimization. The structure calculation based on the surface energy minimization is used mainly in a field of material science, which is applied to a grain growth of polycrystalline material, a solder shape of packaging material, a fluid shape prediction, etc. The example embodiments of the smoothing operation will be described below with reference to FIGS. 20A, 20B and 20C.

The control unit 22 may determine whether smoothing is completed (S620) whenever the smoothing sub-routine of S610 is finished. The completion of smoothing may be determined variously, for example, depending on the scheme of the smoothing process, the degree of the noise reduction, etc.

In some example embodiments, when the smoothing process is performed based on the surface energy minimization, the surface energy before the smoothing sub-routine and the surface energy after the smoothing sub-routine may be obtained. It may be determined that smoothing is completed if the amount of reduction of the surface energy from before to after the smoothing sub-routine is smaller than a reference value. In other example embodiments, a displacement of a vertex classified as a noise component may be obtained, and it is determined that smoothing is completed if the displacement is smaller than a reference value.

When the control unit 22 determines that smoothing is completed (S620: YES), the smoothing operation is completed, and the smoothing unit 24 may provide the output data Dout representing the output structure by reducing noise from the input structure.

When the control unit 22 determines that smoothing is not completed (S620: NO), the control unit 22 removes a minimum edge among the existing entire edges (S722). The smoothing unit 24 performs the smoothing sub-routine again (S610) based on the input data and the boundary conditions excluding the removed minimum edge. The removal of the minimum edge will be described below with reference to FIGS. 13A, 13B and 13C.

Figure 13A:
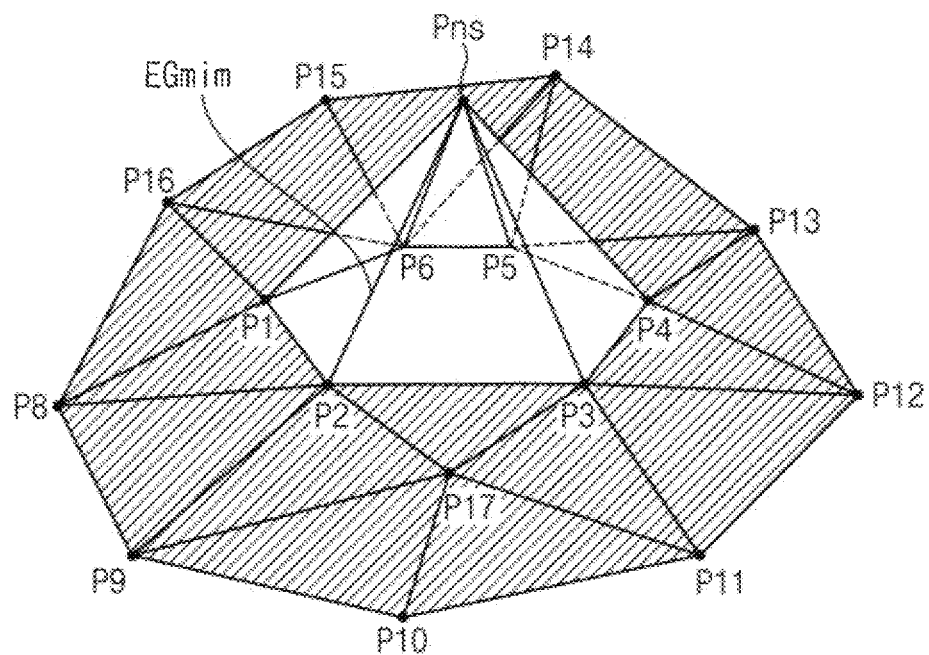
FIGS. 13A, 13B and 13C are diagrams for describing an example embodiment of removing a minimum edge in FIG. 12.
Figure 13B:
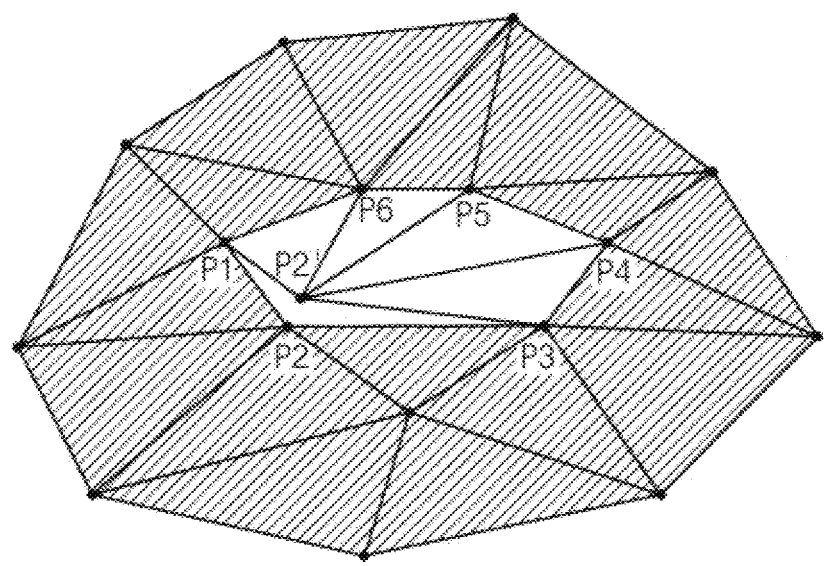
Figure 13C:
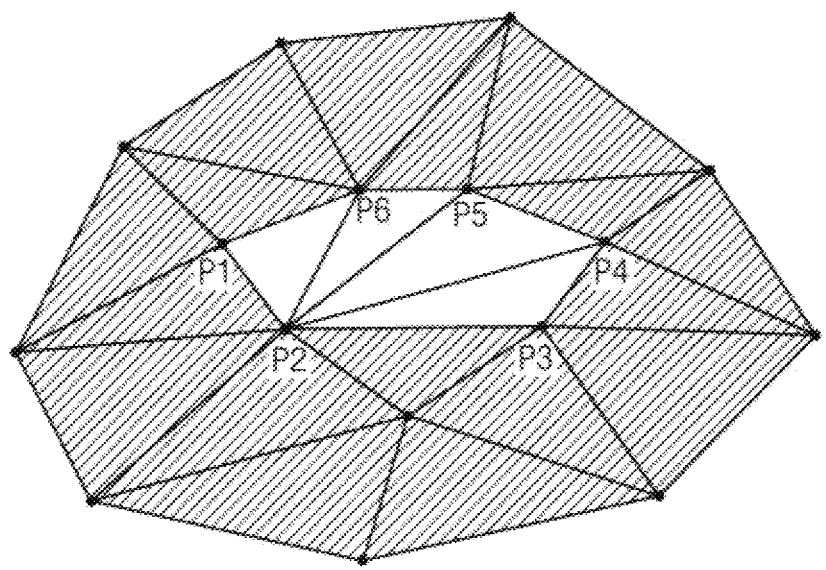

FIGS. 13A, 13B and 13C are diagrams for describing an example embodiment of removing a minimum edge in FIG. 12.

Referring to FIG. 13A, as described above, only one vertex Pns pertains to only the faces that are classified as the noise component. The other vertexes P1 through P16 pertain to at least one of the faces that are classified as the signal component. Thus the vertex Pns may be classified as the noise component whereas the other vertexes P1 through P16 may be classified as the signal components.

For example, an edge connecting the two vertexes Pns and P2 may correspond to the minimum edge EGmin. FIG. 13B represents an intermediate stage of removing the minimum edge Egmin. FIG. 13C illustrates a structure after the minimum edge EGmin is removed.

The minimum edge EGmin may be removed by combining both vertexes Pns and Ps of the minimum edge EGmin. As illustrated in FIG. 13B, the vertex Pns classified as the noise component may be changed to the vertex P2', which is illustrated as distinct from the vertex P2 for convenience of illustration but the vertex P2' is identical to the vertex P2. The edges P1~P2' and P2'~P3 are overlapped with the edges P1~P2 and P2~P3. Thus, the edges P1~P2' and P2'~P3 may be deleted from the data under processing. As a result, after the minimum edge EGmin is removed, the structure of FIG. 13A may be modified to the structure of FIG. 13C.

Even though the removal of the data of the structure elements is described with reference to FIGS. 12 through 13C, example embodiments of the present disclosure are not limited thereto.

In some example embodiments, a threshold length of the edges may be determined and noise edges having a length shorter than the threshold length among the edges may be removed. In this case, whenever the smoothing sub-routine is repeated, two or more edges may be removed or no edge may be removed.

In other example embodiments, whenever the smoothing sub-routine is repeated, N shortest edges among the entire edges may be removed, where N is a natural number greater than 1. In this case, both vertexes of each noise edge may be combined as described with reference to FIGS. 13A, 13B and 13C.

As such, in comparison with conventional schemes of reducing noise by adding structure elements, the method and device according to example embodiments may reduce the structure noise with a decreased data processing time by sequentially removing data of structure elements to simultaneously remove the errors in the input structure.

Figure 14A:
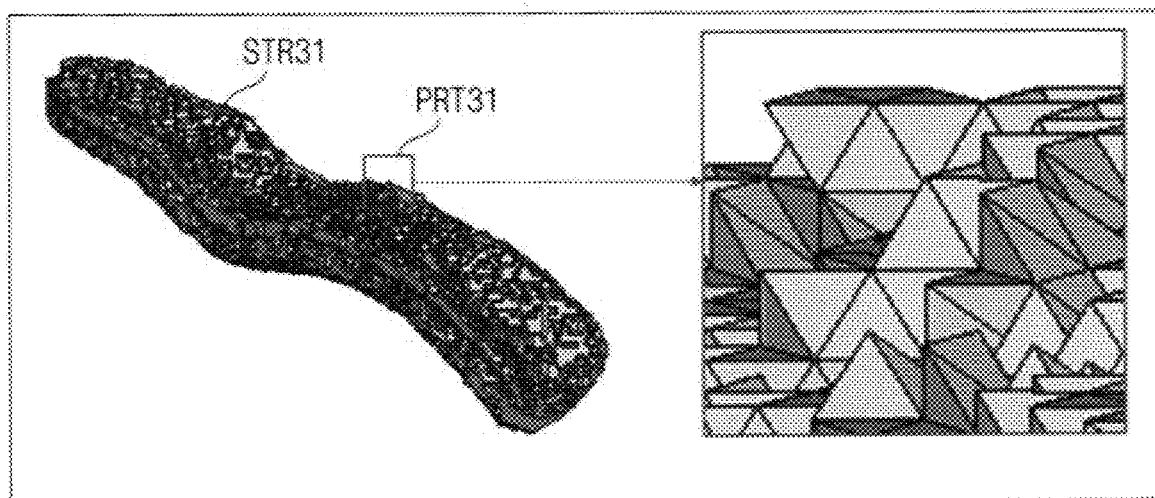
FIGS. 14A and 14B are diagrams illustrating an example result of a noise reduction according to the method of FIG. 11.
Figure 14B:
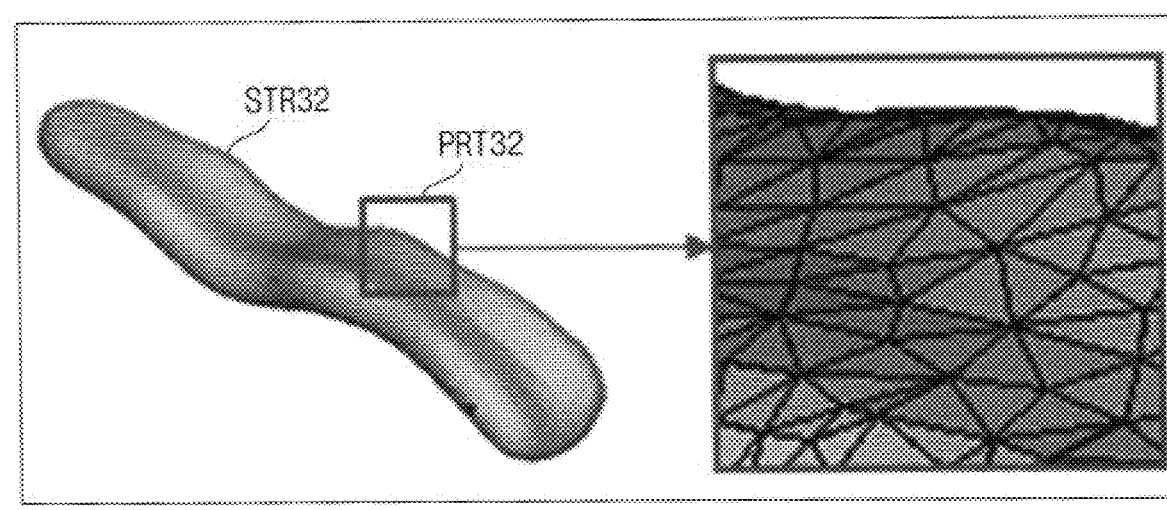

FIGS. 14A and 14B are diagrams illustrating an example result of a noise reduction according to the method of FIG. 11.

The method of FIG. 11 may be applied even when the signal component is not detected during boundary condition setting and all structure elements are considered as the noise components. FIG. 14A illustrates an example input structure STR31 the entire structure elements of which are determined as the noise components. FIG. 14B illustrates an output structure STR32 corresponding to a result of performing the smoothing operation with respect to the input structure STR31 according to the method of FIG. 11. Enlarged view of portions PRT31 and PRT 32 of the structures STR31 and STR32 are illustrated together in FIGS. 14A and 14B.

Structural errors may include mesh intersection such that meshes are crossed. The structural errors may be caused if the edge is removed without the self-structure analysis described above and generally herein.

The number of the faces of the input structure STR31 is 42048 and the number of the faces of the output structure STR32 is 7984. As such the structure noise may be removed stably by performing the smoothing operation accompanying the removal of data of a portion of the structure elements and the processing time may be reduced from the conventional case of about 180 hours to about 1.5 hour. The operation of smoothing shapes that has been impossible by the conventional methods may be implemented through the methods described in example embodiments herein.

Figure 15:
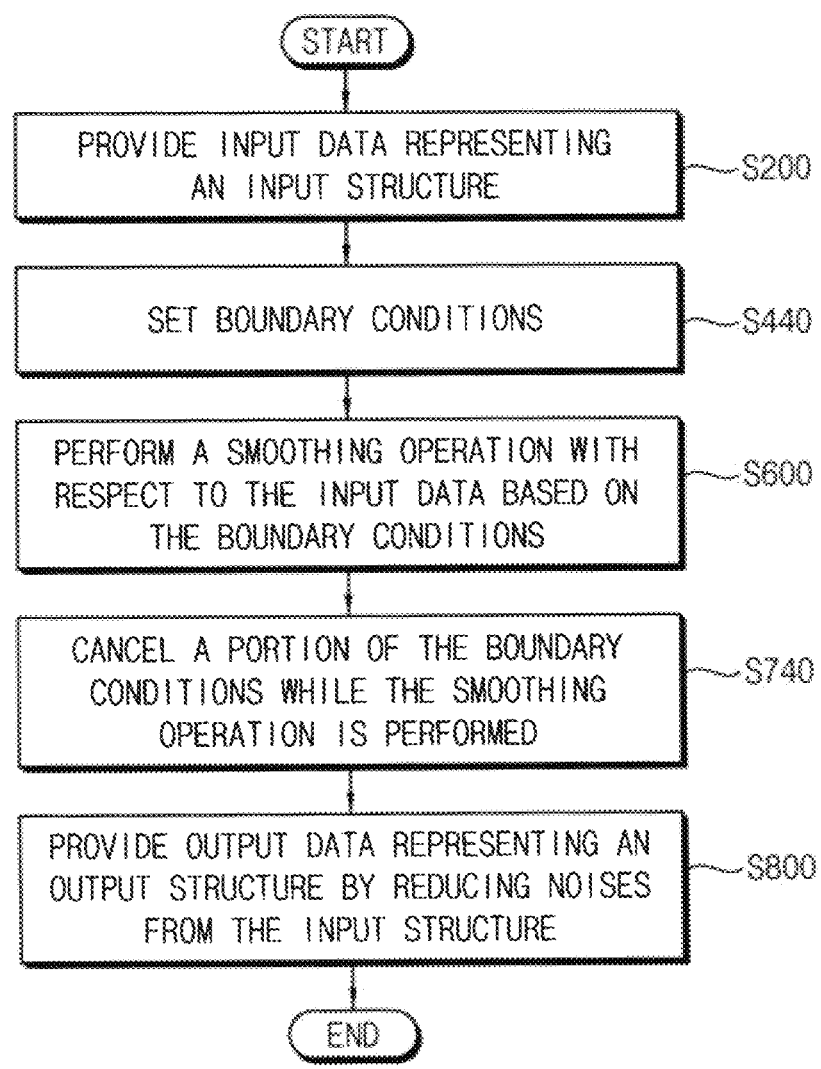
FIG. 15 is a flow chart illustrating a method of reducing structure noise according to example embodiments of the present disclosure.

FIG. 15 is a flow chart illustrating a method of reducing structure noise according to example embodiments of the present disclosure.

Referring to FIG. 15, input data representing an input structure is provided (S200). Boundary conditions are set (S440) by classifying data of each of multiple structure elements of the input data as a signal component or a noise component. A smoothing operation is performed with respect to the input data based on the boundary conditions (S600). A portion of the boundary conditions is canceled while the smoothing operation is performed (S740).

The processes S200, S440, S600 and S800 of the method of FIG. 15 are the same as those of FIG. 11. Thus, the repeated descriptions are omitted. Hereinafter example embodiments of performing a smoothing operation accompanying the boundary condition canceling will be described with reference to FIGS. 16 through 18C.

Figure 16:
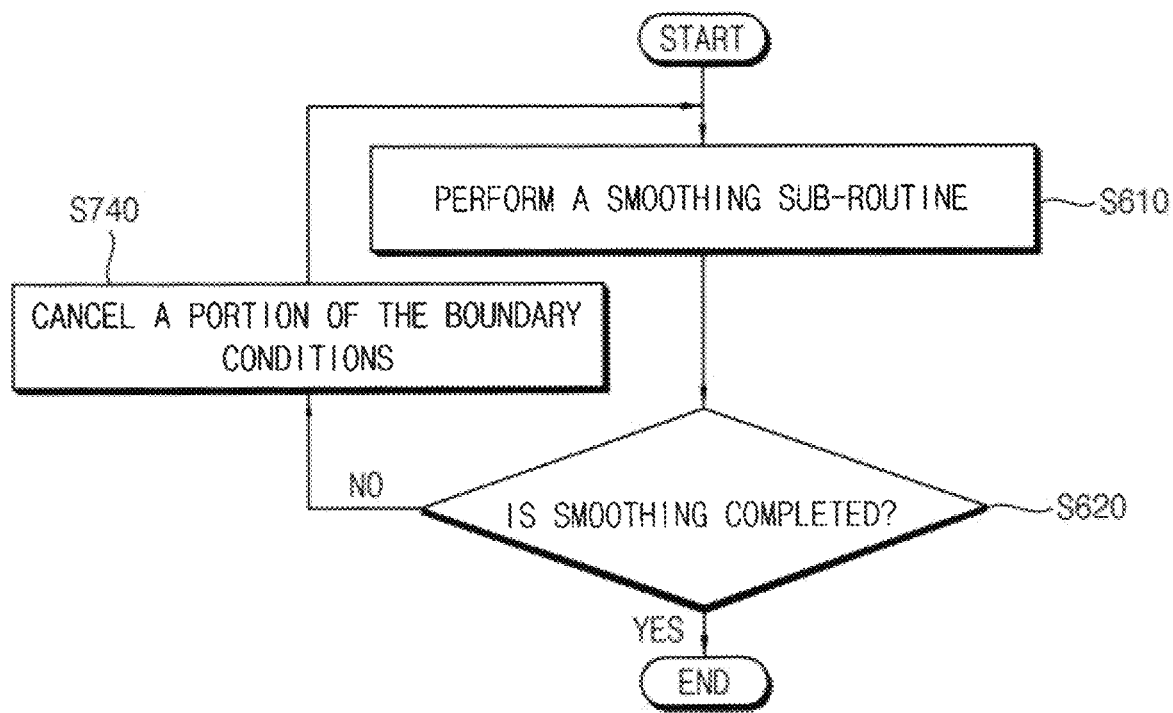
FIG. 16 is a flow chart illustrating an example embodiment of performing a smoothing operation and canceling a portion of boundary conditions included in the method of FIG. 15.

FIG. 16 is a flow chart illustrating an example embodiment of performing a smoothing operation and canceling a portion of boundary conditions included in the method of FIG. 15.

Referring to FIGS. 3 and 16, the smoothing unit 24 performs a smoothing sub-routine (S610). The above mentioned smoothing operation may be performed such that the smoothing sub-routine is repeatedly executed based on data representing a structure and boundary conditions.

The control unit 22 may determine whether smoothing is completed (S620) whenever the smoothing sub-routine is finished. The completion of smoothing may be determined variously, for example, depending on the scheme of the smoothing process, the degree of the noise reduction, etc.

When the control unit 22 determines that smoothing is completed (S620: YES), the smoothing operation is completed and the smoothing unit 24 may provide the output data Dout representing the output structure by reducing noise from the input structure.

When the control unit 22 determines that smoothing is not completed (S620: NO), the control unit 22 cancels a portion of the boundary conditions (S740) and the smoothing unit 24 performs the smoothing sub-routine again (S610) based on the data and the boundary conditions excluding the cancelled portion of the boundary conditions.

Figure 17:
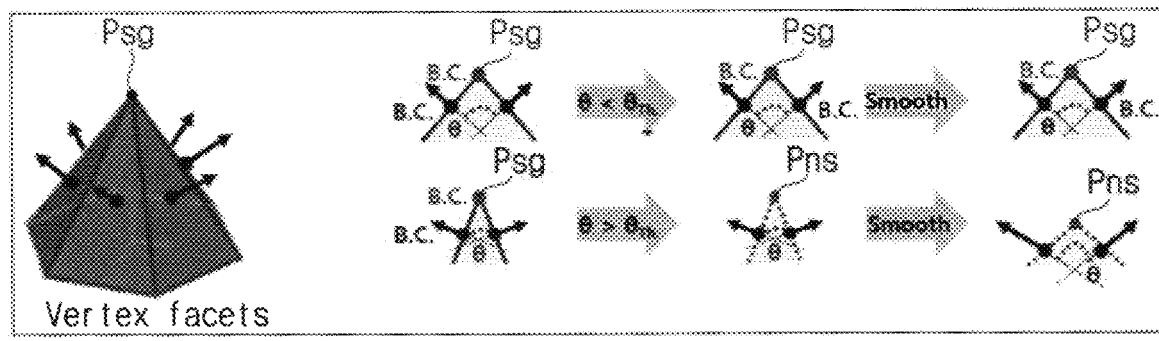
FIG. 17 is a diagram for describing an example embodiment of canceling a boundary condition in FIG. 16.

FIG. 17 is a diagram for describing an example embodiment of canceling a boundary condition in FIG. 16.

The left portion of FIG. 17 illustrates a vertex Psg classified as a signal component and corresponding vertex faces with normal vectors represented by arrows. The right portion of FIG. 17 illustrates a process of canceling a boundary condition based on a comparison result of a vertex face angle θ and a threshold angle θ Th.

Referring to FIG. 17, the vertex face angle θ with respect to the vertex Psg classified as the signal component may be calculated and the threshold angle $\theta_{Th}$ of the vertex face angles may be determined. The boundary condition may be canceled based on comparison results of the vertex face angle θ and the threshold angle $\theta_{Th}$. Here the vertex Psg classified as the signal component indicates a vertex to which the boundary condition is set such that the movement of the vertex Psg is restricted during the smoothing operation as described above.

When the vertex face angle θ is smaller than the threshold angle $\theta_{Th}$, the vertex Psg may maintain the boundary condition. Thus, the movement of the vertex Psg may be restricted during the smoothing operation. In contrast, when the vertex face angle θ is smaller than the threshold angle $\theta_{Th}$, the signal vertex Psg may be changed to the noise vertex Pns, that is, the boundary condition of the vertex Psg may be canceled. Thus, the vertex Pns may move freely during the smoothing operation.

Figure 18A:
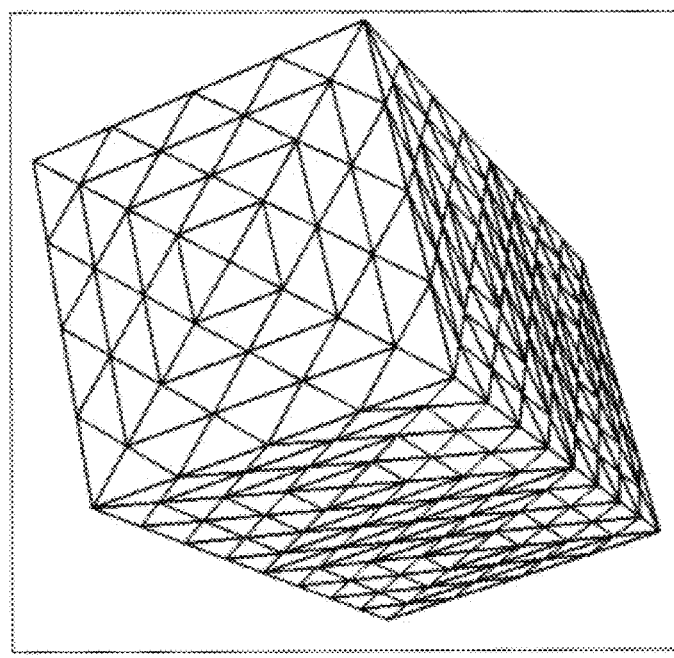
Figure 18B:
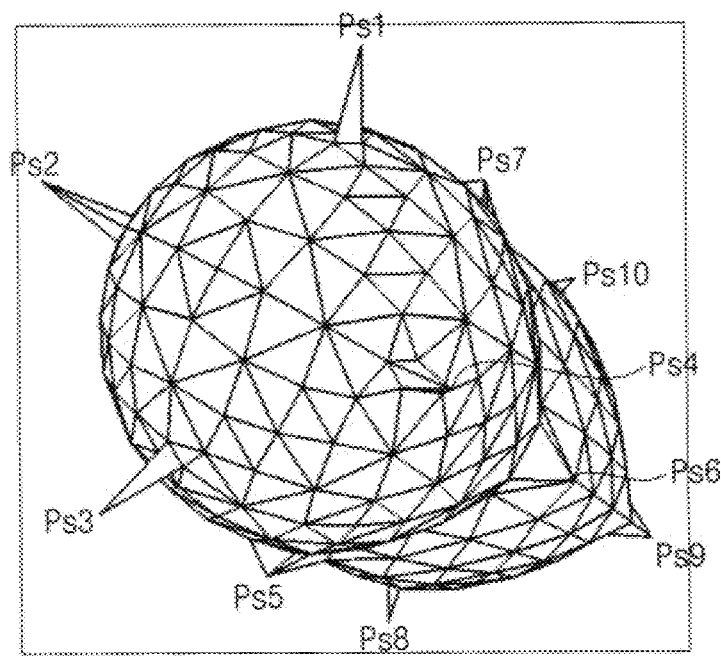

FIGS. 18A, 18B and 14C are diagrams illustrating an example result of a noise reduction according to the method of FIG. 15.

Figure 18C:
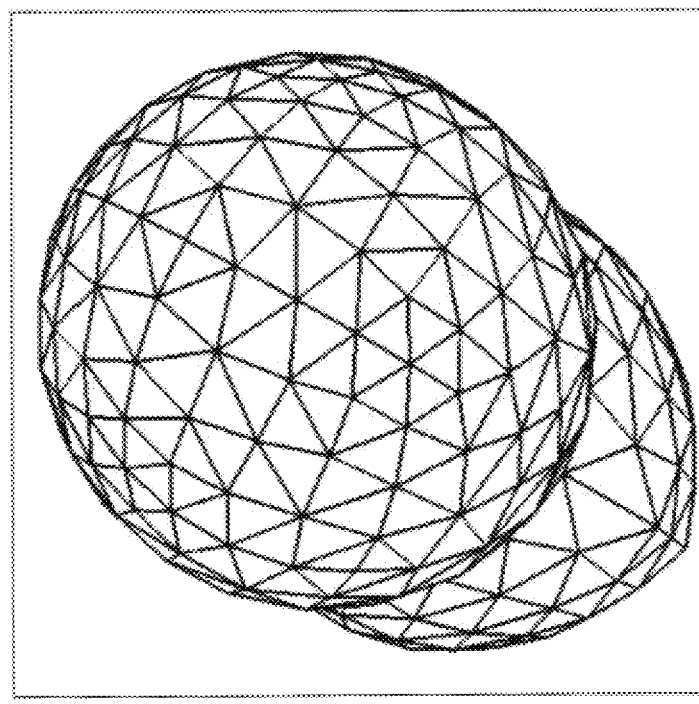

FIG. 18A illustrates an example input structure STR41. FIG. 18B illustrates an output structure STR42 corresponding to a result of performing the smoothing operation with respect to the input structure STR41 without cancelling of the boundary conditions. FIG. 18C illustrates an output structure STR43 corresponding to a result of performing the smoothing operation with respect to the input structure STR41 with cancelling of the boundary conditions.

In a complex structure, a shape may be distorted because the boundary conditions may be set not by the shape itself but by the adjacent shape. Due to a boundary condition set to a vertex, a spike may be caused and the spike may block the removal of the noise component. Such spikes may be removed efficiently by performing the smoothing operation accompanying the cancel of the boundary conditions.

As illustrated in FIG. 18B, spikes corresponding to the vertexes Ps1~Ps10 may be caused if the smoothing operation is performed without cancelling the boundary condition. In contrast, as illustrated in FIG. 18C, the spikes may be removed if the smoothing operation is performed with cancelling of the boundary condition according to example embodiments.

Figure 19:
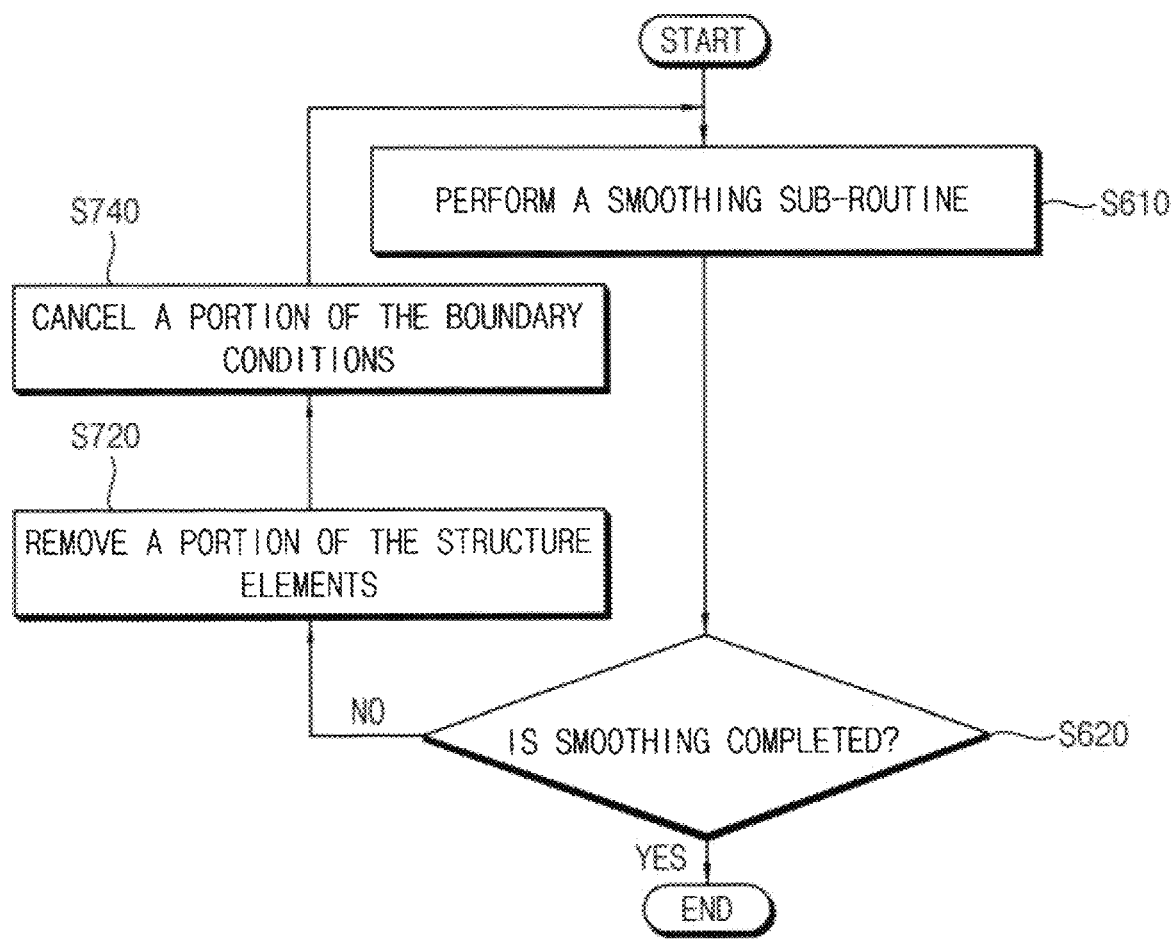
FIG. 19 is a flow chart illustrating an example embodiment of performing a smoothing operation, removing data of a portion of structure elements and canceling a portion of boundary conditions included in a method of reducing structure noise according to example embodiments of the present disclosure.

FIG. 19 is a flow chart illustrating an example embodiment of performing a smoothing operation, removing data of a portion of structure elements and canceling a portion of boundary conditions included in a method of reducing structure noise according to example embodiments.

Referring to FIGS. 3 and 19, the smoothing unit 24 performs a smoothing sub-routine (S610). The above mentioned smoothing operation may be performed such that the smoothing sub-routine is repeatedly executed based on data representing a structure and boundary conditions.

The control unit 22 may determine whether smoothing is completed (S620) whenever the smoothing sub-routine is finished. The completion of smoothing may be determined variously, for example, depending on the scheme of the smoothing process, the degree of the noise reduction, etc.

When the control unit 22 determines that smoothing is completed (S620: YES), the smoothing operation is completed and the smoothing unit 24 may provide the output data Dout representing the output structure by reducing noise from the input structure.

When the control unit 22 determines that smoothing is not completed (S620: NO), the control unit 22 removes data of a portion of structure elements (S720) as described with reference to FIGS. 11 through 14B and cancels a portion of the boundary conditions (S740) as described with reference to FIGS. 15 through 18C. The smoothing unit 24 performs the smoothing sub-routine again (S610) based on the data and the boundary conditions excluding the removed portion of the structure elements and the cancelled portion of the boundary conditions.

Figure 20A:
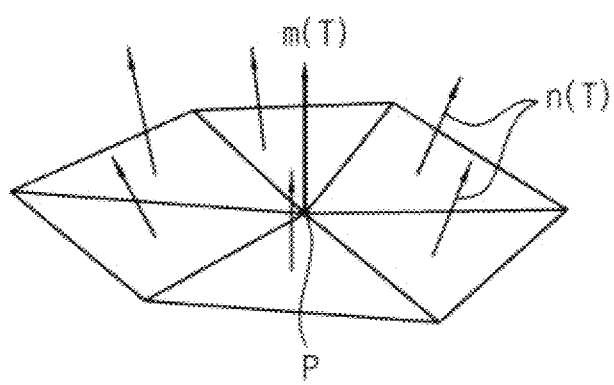
FIGS. 20A, 20B and 20C are diagrams for describing an example embodiment of a smoothing operation included in a method of reducing structure noise according to example embodiments of the present disclosure.
Figure 20B:
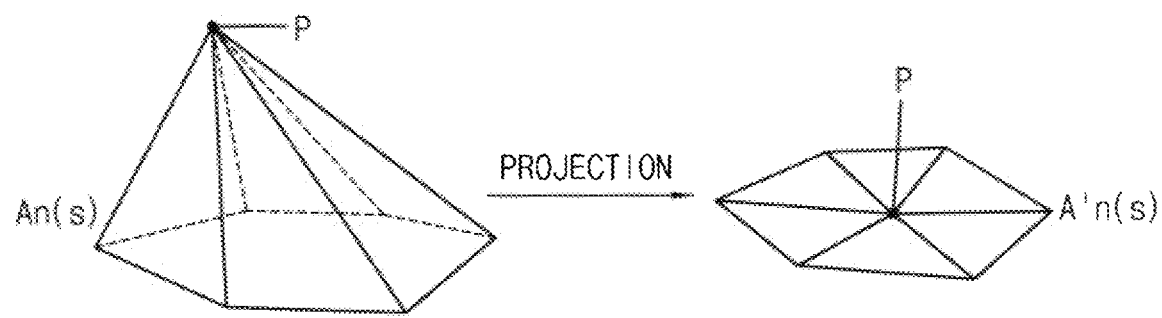
Figure 20C:
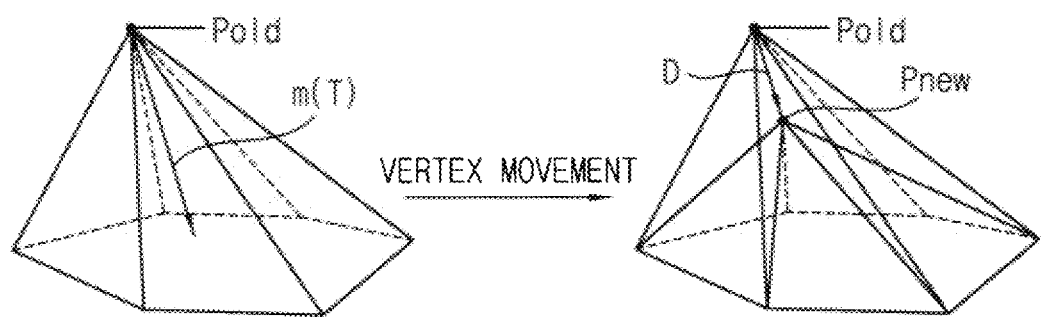

FIGS. 20A, 20B and 20C are diagrams for describing an example embodiment of a smoothing operation included in a method of reducing structure noise according to example embodiments of the present disclosure.

In some example embodiments, a smoothing operation may be performed with respect to a noise vertex P classified as a noise component based on area information of a three-dimensional mesh corresponding to the noise vertex P and area information of a two-dimensional mesh corresponding to a projection of the noise vertex P to a plane along a direction of a normal vector. The smoothing operation may be performed using a first area An(s) of the three-dimensional meshes adjacent to the noise vertex P and a second area A'n(S) of the two-dimensional meshes.

As illustrated in FIG. 20A, the noise vertex P has the adjacent meshes. The normal vector m(T) of the noise vertex P may be obtained using the normal vectors n(T) of the adjacent meshes as Equation4.

$$m(T) = \frac{\sum_{i=1}^{n} n(T)}{n}$$

Equation 4

In Equation4, n indicates a total number of the adjacent meshes and n(T) indicates the normal vector of each adjacent mesh.

The noise vertex P in three dimensions of the left portion of FIG. 20B may be projected along the plane perpendicular to the normal vector m(T) as illustrated in the right portion of FIG. 20B.

The first area An(s) of the three-dimensional meshes may be obtained by Equation5.

$$A_n(s) = \sum_{i=1}^{n} A_n(T)$$

Equation 5

In Equation5, T indicates the mesh adjacent to the noise vertex P and An(T) indicates an area of each mesh.

The second area A'n(S) of the two-dimensional meshes may be obtained, for example, by a Gauss-Green method.

The area ratio An(s)/A'n(s) may be obtained from the first area An(s) of the three-dimensional meshes and the second area A'n(S) of the two-dimensional meshes. An average $\overline{m}$ of the area ratios An(s)/A'n(s) of all noise vertexes may be obtained by Equation6.

$$\overline{m} = \frac{\sum_{i=1}^{n} \left[\frac{A_n(s)}{A'_n(s)}\right]}{n}$$

Equation 6

In Equation6, n indicates a total number of the noise vertexes representing a three-dimensional structure.

A displacement of the noise vertex P may be obtained using the first area An(s) of the three-dimensional meshes, the second area A'n(S) of the two-dimensional meshes, the average $\overline{m}$ and the standard deviation a of the area ratios An(s)/A'n(s), as Equation7.

$$D = \min(A(s) - A'(s)\overline{m} + \sigma))$$

Equation 7

In other words, the displacement D of the noise vertex P may be obtained by finding a minimum difference between the first area An(s) of the three-dimensional meshes and the corrected value of the second area A'n(S) of the two-dimensional meshes, as adjusted by the average and standard deviation of the area ratios An(s)/A'n(s). In the left portion of FIG. 22C, the area of the polygon at the bottom plane corresponds to the second area A'n(S) of the two-dimensional meshes, and the area of the six triangular meshes corresponds to the first area An(s) of the three-dimensional meshes. The smoothing operation may be performed such that the displacement D may be applied to update the noise vertex P.

The left portion of FIG. 20C illustrates an old position Pold of the noise vertex P and the right portion of FIG. 20C illustrates a new position Pnew of the noise vertex P when the displacement D is applied.

Even though the smoothing operation has been described with reference to FIGS. 20A, 20B and 20C, example embodiments are not limited thereto. The various smoothing schemes may be adopted as will be appreciated by one skilled in the art.

Figure 21:
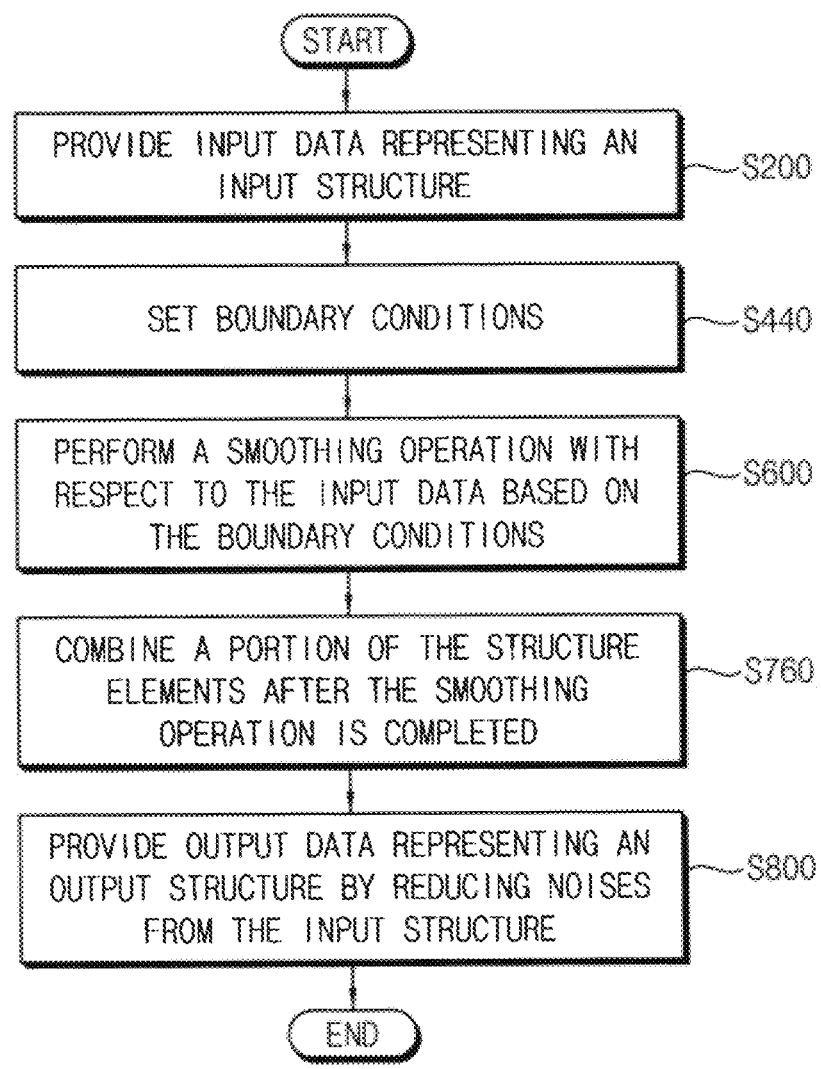
FIG. 21 is a flow chart illustrating a method of reducing structure noise according to example embodiments of the present disclosure.

FIG. 21 is a flow chart illustrating a method of reducing structure noise according to example embodiments of the present disclosure.

Referring to FIG. 21, input data representing an input structure is provided (S200). The input structure may be a two-dimensional structure or a three-dimensional structure and the input structure may be provided through various methods. In some example embodiments, the input data may be generated by an electronic design automation (EDA) tool. In other example embodiments, the input data may be provided by processing image data that is captured using an image sensor. In still other example embodiments, the input data may be provided by restructuring data using a computer vision. The method of providing the input data is not limited thereto and the input data may be provided through other various methods.

Boundary conditions are set (S440). In some example embodiments, the boundary conditions may be set by classifying data of each of multiple structure elements of the input data as a signal component or a noise component. In other example embodiments, the boundary conditions may be accepted from a user. In still other example embodiments, the boundary conditions may be set by classifying the structure elements with the settings from the user.

A smoothing operation is performed with respect to the input data based on the boundary conditions (S600). A portion of the structure elements is combined after the smoothing operation is completed (S760). After the smoothing operation and the combining of the structure elements, output data representing an output structure is provided by reducing noise from the input structure (S800).

The processes S200, S440, S600 and S800 of the method of FIG. 21 are the same as those of FIG. 11. Thus, the repeated descriptions are omitted. Example embodiments of combining the structure elements will be described below with reference to FIGS. 22 through 24B.

Figure 22:
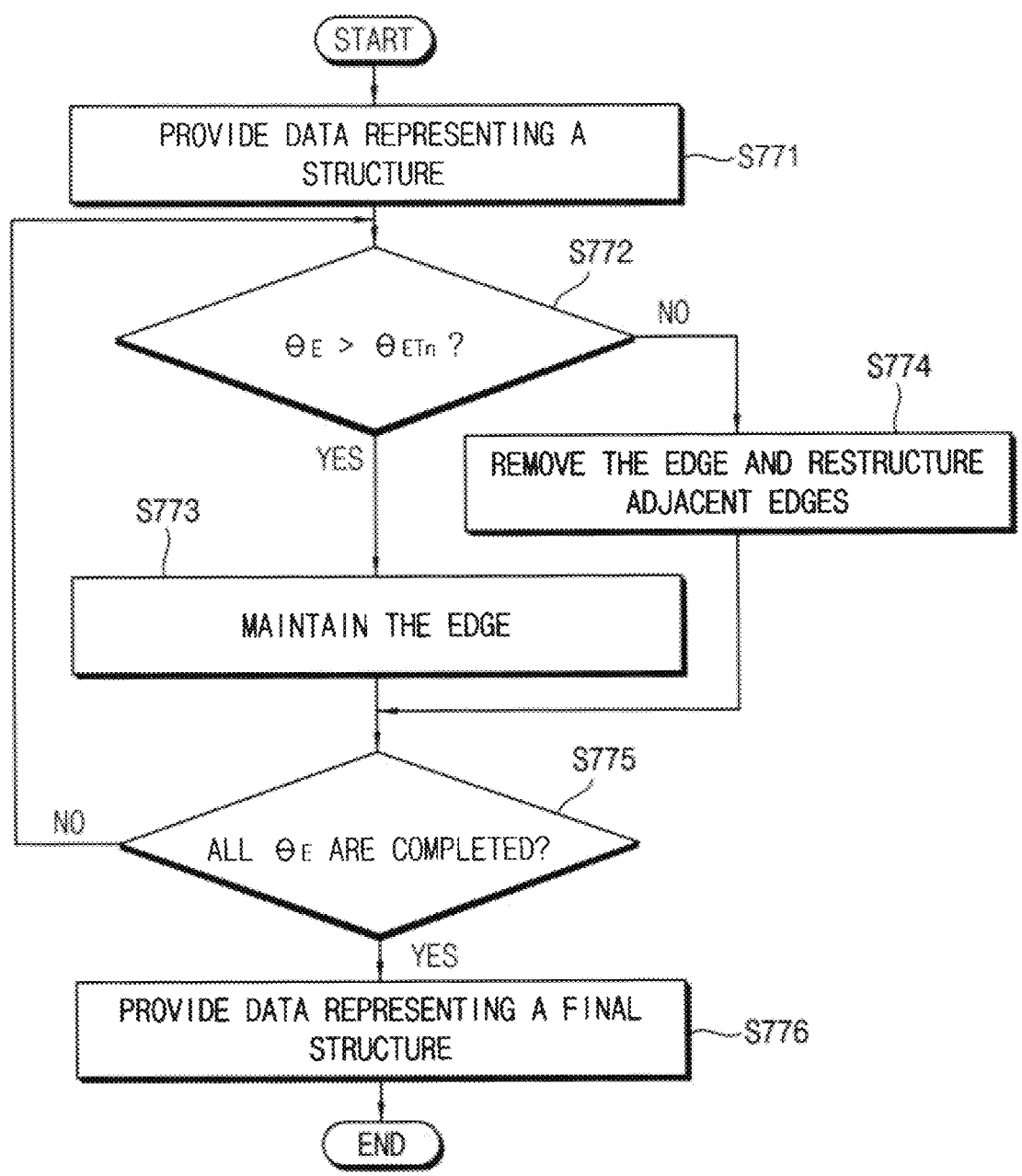
FIG. 22 is a flow chart illustrating an example embodiment of combining structure elements included in the method of FIG. 21.

FIG. 22 is a flow chart illustrating an example embodiment of combining structure elements included in the method of FIG. 21.

FIG. 22 illustrates an example of removing an edge for combining the structure elements. Referring to FIG. 22, data representing a structure is provided (S771). The data may be the above-mentioned input data or the data after the smoothing operation is completed.

With respect to each edge, an edge angle $\theta_E$ is calculated and a threshold angle $\theta_{ETh}$ of the edge angles may be determined. The adjacent faces may be combined based on comparison results of the edge angle $\theta_E$ and the threshold angle $\theta_{ETh}$.

When the edge angle $\theta_E$ is greater than the threshold angle $\theta_{ETh}$ (S772: YES), the corresponding edge may be maintained (S773). When the edge angle $\theta_E$ is smaller than the threshold angle $\theta_{ETh}$ (S772: NO), the corresponding edge may be removed and the adjacent edges may be restructured (S774).

When the process is completed for all edge angles (S775: YES), the data representing a final structure is provided (S776). When the process is not completed for all edge angles (S775: YES), the above processes S772, S773 and S774 are repeated for another edge angle.

Figure 23A:
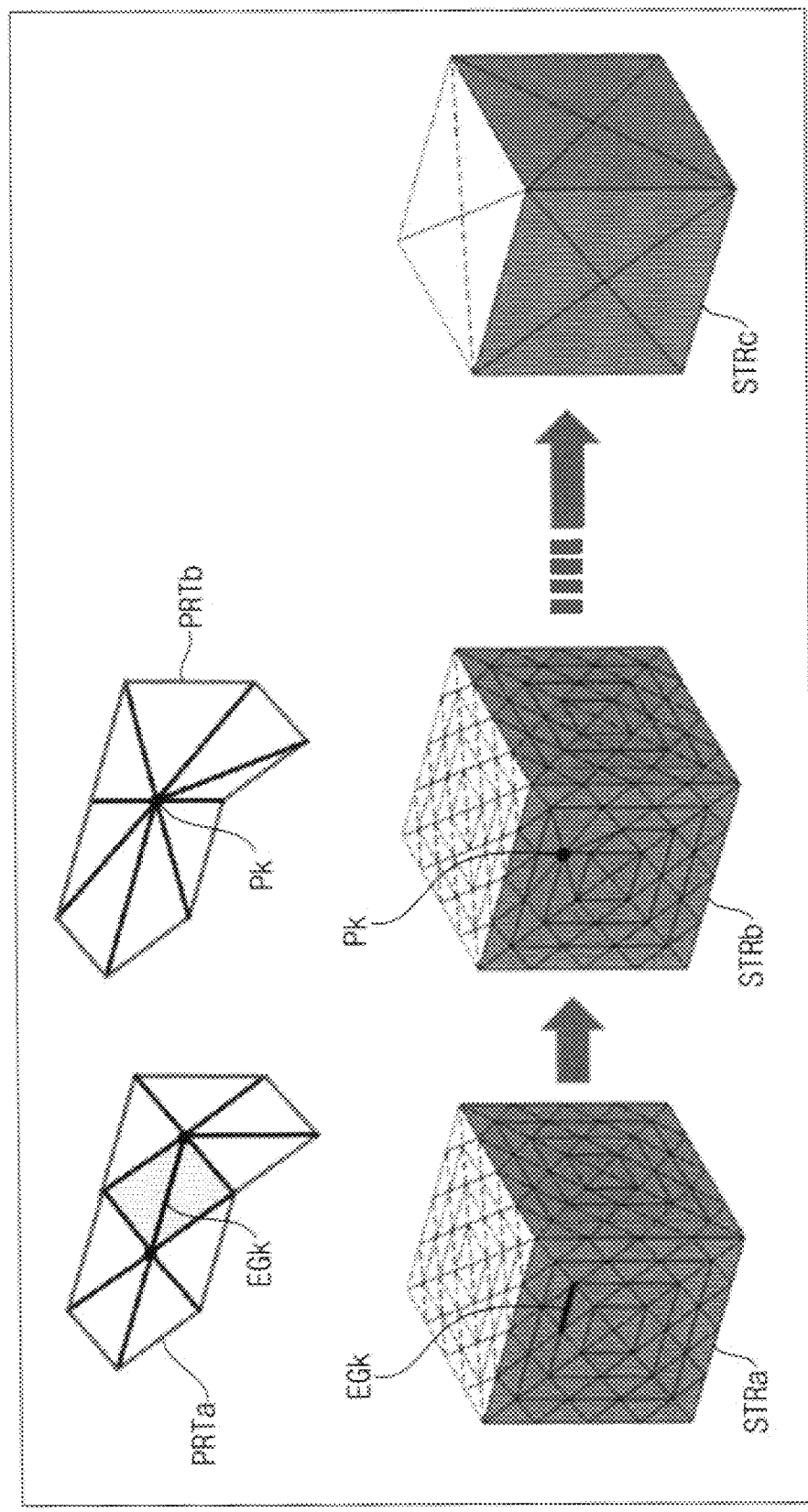
FIGS. 23A and 23B are diagrams for describing an example embodiment of combining structure elements of FIG. 22.
Figure 23B:
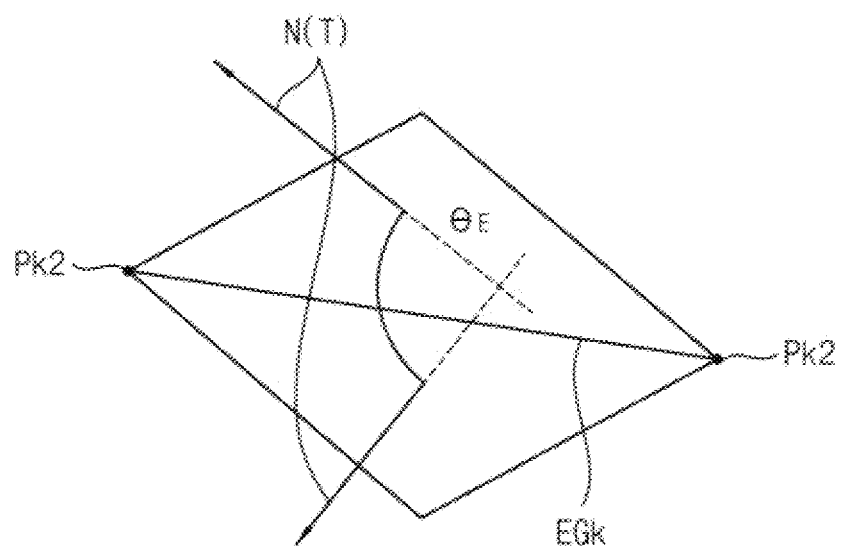

FIGS. 23A and 23B are diagrams for describing an example embodiment of combining structure elements of FIG. 22.

FIG. 23A illustrates a first structure STRa, a second structure STRb, a third structure STRc and enlarged views of a first portion PRTa of the first structure STRa and a second portion PRTb of the second structure STRb. FIG. 23B illustrates an edge angle $\theta_E$ corresponding to an edge EGk.

As illustrated in FIG. 23B, the edge angle $\theta_E$ may be obtained using the normal vectors N(T) of the faces adjacent to the edge EGk connecting the two vertexes Pk1 and Pk2. It is assumed that the edge angle $\theta_E$ satisfies the condition(s) of FIG. 22 for removing the edge EGk.

Referring to FIGS. 23A and 23B, the two vertexes Pk1 and Pk2 of the edge EGk in the first structure STRa may be combined into the one edge Pk in the second structure STRb. Accordingly the edge EGk may be removed and the adjacent edges may be restructured. After such removal of the edges is completed, the first structure STRa may be modified to the third structure STRc simpler than the first structure STRa.

Figure 24A:
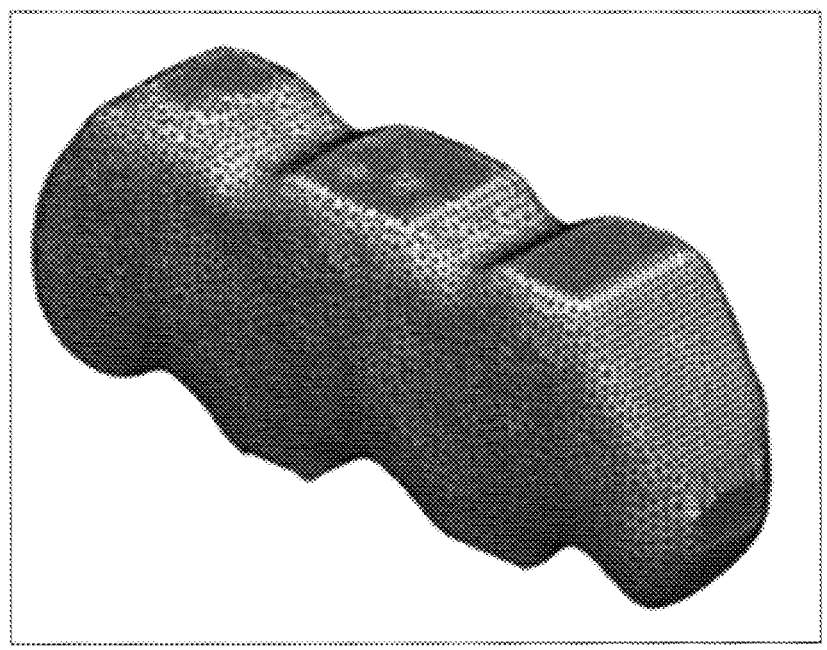
FIGS. 24A and 24B are diagrams illustrating an example result of a noise reduction according to the method of FIG. 21.
Figure 24B:
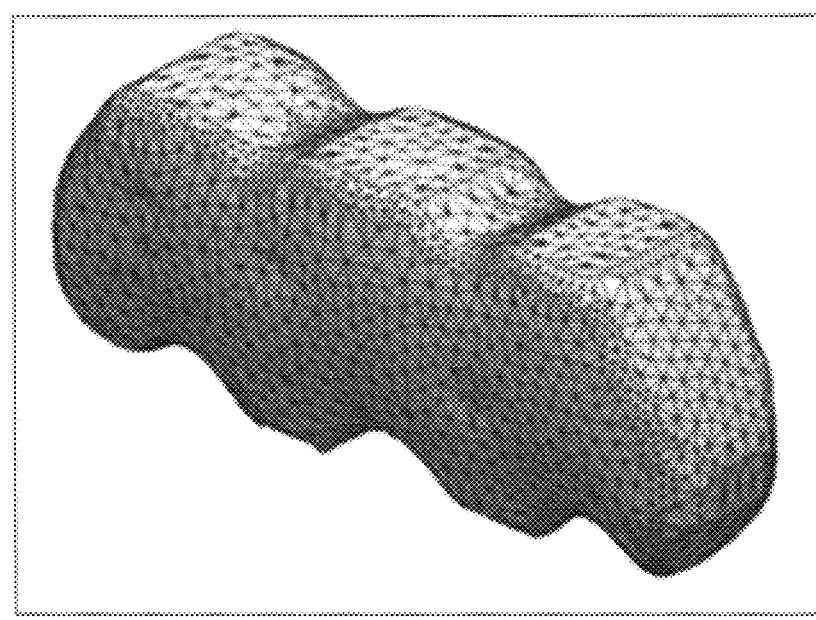

FIGS. 24A and 24B are diagrams illustrating an example result of a noise reduction according to the method of FIG. 21.

To reduce the data processing time and enhance probability reducing the noise, it is required to decrease the number of the structure elements while the shape of the structure is maintained. For example, each edge angle $\theta_E$ may be calculated and each edge angle $\theta_E$ may be compared with the threshold angle $\theta_{ETh}$. If the edge angle $\theta_E$ is greater than the threshold angle $\theta_{ETh}$, the corresponding edge may be considered as the signal component defining the structure. If the edge angle $\theta E$ is smaller than the threshold angle $\theta_{ETh}$, the corresponding edge may be removed as the noise component and the adjacent faces may be combined.

FIG. 24A illustrates an example structure STR51 before combining the structure elements. FIG. 24B illustrates a structure STR52 corresponding to a result of combining the structure elements with respect to the structure STR51 as described above. The structure STR52 of FIG. 24B includes 2762 vertexes whereas the structure STR51 of FIG. 24A includes 8082 vertexes. As such the complex structure STR51 may be simplified to the structure STR52 with 34% of the original vertexes.

Figure 25:
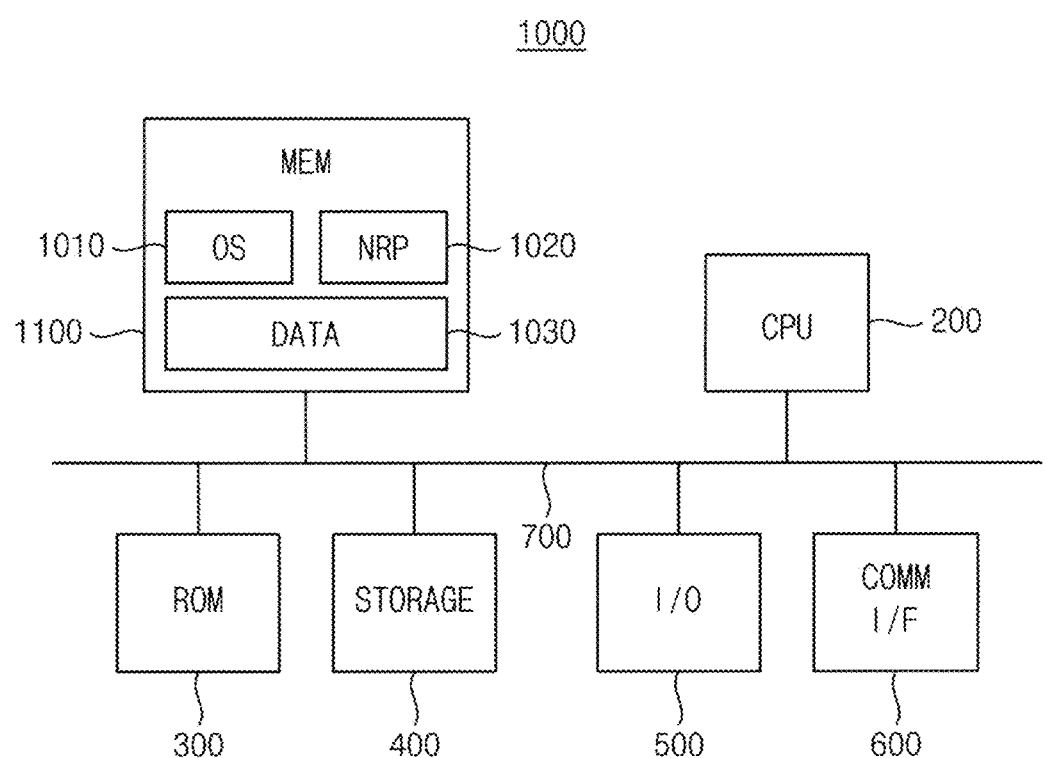
FIG. 25 is a block diagram illustrating an electronic system according to example embodiments of the present disclosure.

FIG. 25 is a block diagram illustrating an electronic system according to example embodiments of the present disclosure.

Referring to FIG. 25, a computer-based electronic system 1000 may include a memory device MEM 1100, a processor CPU 200, a read only memory device ROM 300, a storage device 400, an input-output device I/O 500, a communication interface COMM I/F 600, and a signal bus 700 electrically connecting them.

The memory device 1100 may, as a main memory, store operation system OS 1010, a noise reduction program NRP 1020 for reducing structure noise, and data 1030.

The method of and device for reducing structure noise according to example embodiments may be implemented with hardware, software or a combination of hardware and software. For example, the device for reducing structure noise as described with reference to FIG. 2 may be implemented using a program stored in the memory device 1100 that is readable by the processor 200.

The input device in the input-output device 500 may receive input data representing an input structure. The memory device may store information including program routines for setting boundary conditions by classifying data of each of multiple structure elements of the input data as a signal component or a noise component, performing a smoothing operation with respect to the input data based on the boundary conditions and providing output data representing an output structure by reducing noise from the input structure. The output device included in the input-output device 500 may display the input structure and the output structure. The processor 200 may be connected to the input device, the output device and the memory device to control an execution of the program routines.

As described above, the method and device according to example embodiments of the present disclosure may reduce structure noise efficiently with respect to an arbitrary input structure without requiring additional information on the signal components of the input structure by analyzing the input structure itself to set the boundary condition and by separating the noise from the data of the valid structure. In addition, in comparison with conventional schemes of reducing noise by adding structure elements, the method and device according to example embodiments of the present disclosure may reduce the structure noise with a decreased data processing time by sequentially removing data of structure elements to simultaneously remove the errors in the data of the input structure.

The inventive concepts of the present disclosure may be applied to various fields requiring analysis and/or processing of a two dimensional or three-dimensional structure. For example, the inventive concepts may be applied to fields for analyzing and processing data generated by an electronic design automation (EDA) tool, data provided by processing image data that is captured using an image sensor, data provided by restructuring data using a computer vision.

The foregoing is illustrative of example embodiments and is not to be construed as limiting thereof. Although a few example embodiments have been described, those skilled in the art will readily appreciate that many modifications are possible in the example embodiments without materially departing from the concepts described herein.

What is claimed is:

1. A method of reducing structure noise, comprising:
   obtaining input data representing an input structure;

setting boundary conditions defining boundaries of structure elements of the input structure by classifying data of each of multiple structure elements of the input data as a signal component or a noise component;

performing a smoothing operation with respect to the input data based on the boundary conditions; and providing output data representing an output structure by reducing noise from the input structure.

2. The method of claim 1, wherein setting the boundary conditions is performed by analyzing only the input data without additional information on the input structure.

3. The method of claim 1, wherein setting the boundary conditions includes:

analyzing plane equations of faces included in the structure elements;

grouping the faces into face groups based on the plane equations of the faces;

calculating area ratios, each area ratio corresponding to a ratio of a total area of each face group with respect to an entire area of the faces;

determining a threshold ratio of each area ratio; and setting the boundary conditions based on comparison results of the area ratios and the threshold ratio.

4. The method of claim 3, wherein setting the boundary conditions based on the comparison results includes:

classifying the faces of a face group having an area ratio greater than a threshold ratio as the signal component; and classifying the faces of a face group having an area ratio smaller than a threshold ratio as the noise component.

5. The method of claim 4, wherein setting the boundary conditions based on the comparison results further includes:

classifying a first vertex as the signal component if the first vertex pertains to at least one of the faces that are classified as the signal component;

classifying a second vertex as the noise component if the second vertex pertains to only the faces that are classified as the noise component; and setting the boundary conditions with respect to vertexes that are classified as the signal component.

6. The method of claim 3, wherein determining the threshold ratio of each area ratio includes:

determining the threshold ratio based on a distribution of numbers of the face groups.

7. The method of claim 6, wherein a range of the area ratios is obtained such that the numbers of the face groups in the range are zero continuously and a center value of the range of the area ratios is determined as the threshold ratio.

8. The method of claim 6, wherein the threshold ratio is determined based on the distribution of numbers of the face groups.

9. The method of claim 1, further comprising:

removing data of a portion of the structure elements while the smoothing operation is performed.

10. The method of claim 9, wherein removing the data of the portion of the structure elements includes:

removing a minimum edge having a shortest length among edges included in the structure elements.

11. The method of claim 10, wherein removing the minimum edge includes:

combining each vertex of the minimum edge.

12. The method of claim 9, wherein the removing the data of the portion of the structure elements includes:

determining a threshold length of edges included in the structure elements; and removing noise edges having a length shorter than the threshold length among the edges.

13. The method of claim 1, further comprising:

canceling a portion of the boundary conditions while the smoothing operation is performed.

14. The method of claim 13, wherein canceling the portion of the boundary conditions includes:

calculating vertex face angles with respect to vertexes classified as the signal component among vertexes included in the structure elements;

determining a threshold angle of the vertex face angles; and canceling the boundary conditions based on comparison results of the vertex face angles and the threshold angle.

15. The method of claim 1, further comprising:

combining a portion of the structure elements after the smoothing operation is completed.

16. The method of claim 15, wherein combining the portion of the structure elements includes:

calculating edge angles with respect to edges included in the structure elements;

determining a threshold angle of the edge angles; and combining adjacent faces based on comparison results of the edge angles and the threshold angle.

17. The method of claim 1, further comprising:

generating and displaying a representation of the output structure based on the output data.

18. The method of claim 17, wherein the representation of the output structure has fewer structure elements than the representation of the input structure as a result of reducing the noise.

19. A device for reducing structure noise, comprising:

a controller configured to set boundary conditions defining boundaries of structure elements of the input structure by classifying data of each of multiple structure elements of input data as a signal component or a noise component based on input data representing an input structure; and a smoothing component configured to perform a smoothing operation with respect to the input data based on the boundary conditions and to provide output data representing an output structure by reducing noise from the input structure.

20. A computer-based electronic system for reducing structure noise, comprising:

an input device configured to receive input data representing an input structure;

a memory device configured to store information including program routines that, when executed, set boundary conditions defining boundaries of structure elements of the input structure by classifying data of each of multiple structure elements of the input data as a signal component or a noise component, perform a smoothing operation with respect to the input data based on the boundary conditions, and provide output data representing an output structure by reducing noise from the input structure;

an output device configured to display the input structure and the output structure; and a processor connected to the input device, the output device and the memory device, the processor configured to control execution of the program routines.

* * * * *